(12) United States Patent
Kobayashi et al.

(10) Patent No.: US 9,536,672 B2
(45) Date of Patent: Jan. 3, 2017

(54) STORAGE MODULE

(75) Inventors: Shigemi Kobayashi, Higashimatsuyama (JP); Shuuichi Araki, Saitama (JP); Kazumasa Honda, Kitaadachi-gun (JP); Masami Takeda, Ageo (JP)

(73) Assignee: UD TRUCKS CORPORATION, Saitama (JP)

( * ) Notice: Subject to any disclaimer, the term of this patent is extended or adjusted under 35 U.S.C. 154(b) by 1098 days.

(21) Appl. No.: 13/394,833

(22) PCT Filed: Sep. 15, 2010

(86) PCT No.: PCT/JP2010/065945
§ 371 (c)(1),
(2), (4) Date: Mar. 8, 2012

(87) PCT Pub. No.: WO2011/034093
PCT Pub. Date: Mar. 24, 2011

(65) Prior Publication Data
US 2012/0171551 A1 Jul. 5, 2012

(30) Foreign Application Priority Data
Sep. 16, 2009 (JP) .................................. 2009-214288

(51) Int. Cl.
*H01G 9/008* (2006.01)
*H01M 2/20* (2006.01)
(Continued)

(52) U.S. Cl.
CPC .............. *H01G 9/016* (2013.01); *H01G 9/155* (2013.01); *H01G 9/26* (2013.01); *H01G 11/10* (2013.01);
(Continued)

(58) Field of Classification Search
CPC ...... H01M 2/02; H01M 2/0207; H01M 2/021; H01M 2/0212; H01M 2/04; H01M 2/06; H01M 2/20; H01M 2/30; H01G 9/016; H01G 9/155; H01G 9/26; H01G 11/12; H01G 11/76; H01G 11/10
See application file for complete search history.

(56) References Cited

U.S. PATENT DOCUMENTS 7,198,866 B2 * 4/2007 Miyamoto .............. H01M 2/26
174/260
7,374,004 B2 * 5/2008 Kraimer ................... B60K 1/04
180/65.1
(Continued)

FOREIGN PATENT DOCUMENTS

JP 60117542 A 6/1985
JP 10108361 A 4/1998
(Continued)

OTHER PUBLICATIONS

Office Action corresponding to JP2009-214288, dated Jul. 16, 2013.
(Continued)

*Primary Examiner* — Alix Eggerding
(74) *Attorney, Agent, or Firm* — Hauptman Ham, LLP

(57) ABSTRACT

This invention provides a storage module formed using a plurality of storage cells. The each storage cell includes a storage unit that stores a charge, a polyhedral container that houses the storage unit and has two opposing surfaces, and a pair of electrode terminals that output and input the charge of the storage unit. The electrode terminals include a positive electrode terminal that projects externally from an end portion of the container and has a joint surface that is formed to be substantially coplanar with one of the two opposing surfaces of the container and joined to an electrode terminal of an adjacent storage cell, and a negative electrode terminal that projects externally from the end portion of the container and has a joint surface that is formed to be substantially coplanar with another of the two surfaces and joined to an electrode terminal of an adjacent storage cell.

14 Claims, 21 Drawing Sheets

(51) Int. Cl.
*H01M 2/30* (2006.01)
*H01M 2/06* (2006.01)
*H01G 9/00* (2006.01)
*H01G 9/26* (2006.01)
*H01G 11/10* (2013.01)
*H01G 11/12* (2013.01)
*H01G 11/76* (2013.01)

(52) U.S. Cl.
CPC .............. *H01G 11/12* (2013.01); *H01G 11/76* (2013.01); *H01M 2/06* (2013.01); *H01M 2/20* (2013.01); *H01M 2/202* (2013.01); *H01M 2/204* (2013.01); *H01M 2/206* (2013.01); *H01M 2/30* (2013.01); *Y02E 60/13* (2013.01)

(56) References Cited

U.S. PATENT DOCUMENTS

| | | | | |
|---|---|---|---|---|
| 2004/0038123 | A1* | 2/2004 | Hisamitsu | H01M 10/0413 429/147 |
| 2007/0231682 | A1* | 10/2007 | Aoyama | H01M 2/021 429/160 |
| 2008/0171259 | A1* | 7/2008 | Kanai et al. | 429/53 |
| 2010/0014217 | A1* | 1/2010 | Kawahara | H01G 9/012 361/523 |
| 2010/0216007 | A1* | 8/2010 | Kane et al. | 429/153 |

FOREIGN PATENT DOCUMENTS

| | | |
|---|---|---|
| JP | 2000182579 A | 6/2000 |
| JP | 2001313233 A | 11/2001 |
| JP | 2002151365 A | 5/2002 |
| JP | 2003217985 A | 7/2003 |
| JP | 2003272966 A | 9/2003 |
| JP | 2005190885 A | 7/2005 |
| JP | 2006108380 A | 4/2006 |
| JP | 2006294985 A | 10/2006 |
| JP | 3986545 A | 7/2007 |
| WO | 2007086219 A1 | 8/2007 |
| WO | WO 2010/099906 * | 10/2010 |

OTHER PUBLICATIONS

International Search Report and Written Opinion for PCT/JP2010/065945 dated Dec. 14, 2010.

* cited by examiner

STORAGE MODULE

RELATED APPLICATIONS

The present application is a National Phase of International Application number PCT/JP2010/065945, filed Sep. 15, 2010, and claims priority from Japanese Application Number 2009-214288, filed Sep. 16, 2009.

FIELD OF THE INVENTION

This invention relates to a storage module formed by laminating a plurality of storage cells.

BACKGROUND OF THE INVENTION

Patent Documents 1 to 8, published by the Japan Patent Office, propose using a lithium battery or an electric double layer capacitor as a storage cell that can be charged and discharged repeatedly.

Referring to FIGS. 33 and 34, an example of a storage cell will be described. A storage cell 100 includes a storage unit 111 that stores a charge, and a container 112 that houses the storage unit 111.

The storage unit 111 includes a positive electrode body, a negative electrode body, and a separator interposed between the positive electrode body and the negative electrode body. The storage unit 111 is formed from an angular laminated body. The positive electrode body and negative electrode body are constituted by an electrode layer that stores a charge, and a collector layer that outputs and inputs the charge. The positive electrode body and the negative electrode body are respectively formed by bundling together identical poles of the collector layer and then joining and electrically connecting an electrode terminal 113 of a corresponding polarity to a resulting bundled portion.

The electrode terminal 113 is formed from a metal plate in a shape having a short length. A first end portion of the electrode terminal 113 is positioned in the interior of the container 112. The bundled portion of the identical poles of the collector layer is joined to the first end portion of the electrode terminal 113. A second end side of the electrode terminal 113 is drawn directly out to the exterior of the container 112. The container 112 is formed from a laminate film, or more specifically a resin film having a laminated structure and including a metallic intermediate layer. The container 112 is tightly sealed while housing the storage unit 111 so that a tip end side of each electrode terminal 113 projects partially to the outside.

The container 112 is constituted by a pair of container members, for example. When the pair of container members are combined, a chamber for housing the storage unit 111 is defined. The storage unit 111 is housed in the interior of the chamber in the container such that the tip end side of the electrode terminal 113 projects to the outside from a flange surrounding the chamber. As shown in FIG. 34, the container 112 is sealed by thermally bonding flanges 112a to each other, whereby the storage unit 111 is housed and tightly sealed such that the tip end side of each electrode terminal 113 partially projects to the outside from a sealing surface of the container 112, or in other words substantially in a thickness direction center of the container 112. In the figure, A, B, and C respectively denote a front surface, a left side surface, and an upper surface of the container 112.

PRIOR ART DOCUMENTS

Patent Documents

Patent Document 1: JP60-117542A
Patent Document 2: JP2006-294985A
Patent Document 3: JP2003-272966A
Patent Document 4: JP2001-313233A
Patent Document 5: JP2005-190885A
Patent Document 6: JP10-108361A
Patent Document 7: JP2002-151365A
Patent Document 8: JP3986545B

SUMMARY OF THE INVENTION

Problems to be Solved by the Invention

In the storage cell 100, a voltage per unit at full charge is between approximately 3 and 5V. In many cases, a plurality of the storage cells 100 are connected in series and used as a storage module raised to a required voltage.

FIG. 35 shows a storage module M100S constituted by a plurality of the storage cells 100. The plurality of storage cells 100 form an aggregate arranged so as to overlap in the thickness direction of the container 112, or in other words a lamination direction of the storage unit 111. The electrode terminals 113 between adjacent storage cells 100 are fixed to each other by welding or the like and thereby electrically connected.

In the storage module M100S, however, the electrode terminals 113 of the respective storage cells 100 are drawn out to the outside from the sealing surface of the container 112, or in other words substantially in the thickness direction center of the container, and therefore, to join the electrode terminals 113 between the storage cells 100, the electrode terminals 113 must be bent in advance into a suitable shape for joining the respective electrode terminals 113. As a result, an operation to establish electric connections between the respective storage cells 100 may require a great deal of time and effort.

Further, in the storage module M100S, a length of the electrode terminals 113 is increased in order to join the electrode terminals 113 of adjacent storage cells 100. As a result, increases occur in electric resistance and heat generation loss in the electrode terminal 113, and therefore countermeasures are required to reduce the electric resistance and heat generation loss.

An object of this invention is to provide a storage module with which an electric resistance of respective terminals can be reduced and processing to join the terminals to each other can be performed efficiently.

Means for Solving the Problems

To achieve the object described above, this invention provides a storage module formed using a plurality of storage cells. The each storage cell includes a storage unit that stores a charge, a polyhedral container that houses the storage unit and has two opposing surfaces, and a pair of electrode terminals that output and input the charge of the storage unit. The electrode terminals include a positive electrode terminal that projects externally from an end portion of the container and has a joint surface that is formed to be substantially coplanar with one of the two opposing surfaces of the container and joined to an electrode terminal of an adjacent storage cell, and a negative electrode terminal that projects externally from the end portion of the container and has a joint surface that is formed to be substantially coplanar with another of the two surfaces and joined to an electrode terminal of an adjacent storage cell.

The details as well as other features and advantages of this invention are set forth in the remainder of the specification and are shown in the accompanying drawings.

DESCRIPTION OF THE PREFERRED EMBODIMENTS

Figure 6:
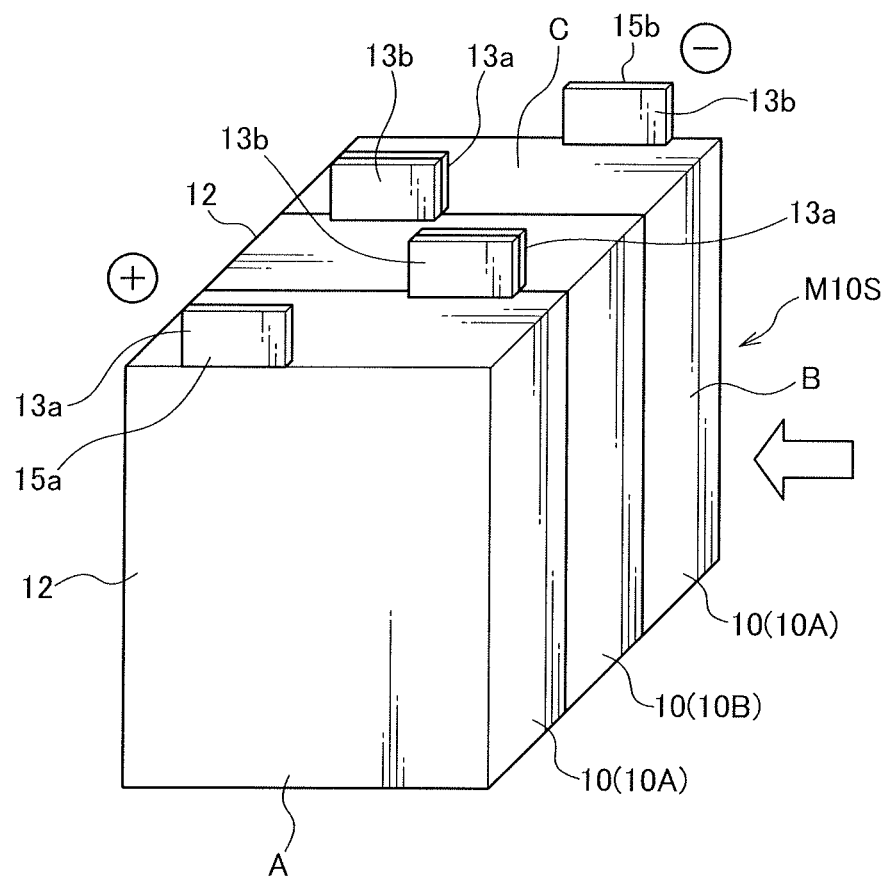
FIG. 6 is a perspective view of a storage module formed using a plurality of storage cells.

First, a storage module M10S according to a first embodiment of this invention will be described. The storage module M10S shown in FIG. 6 is constituted by a laminated body of storage cells 10 shown in FIGS. 1 to 4.

Figure 1:
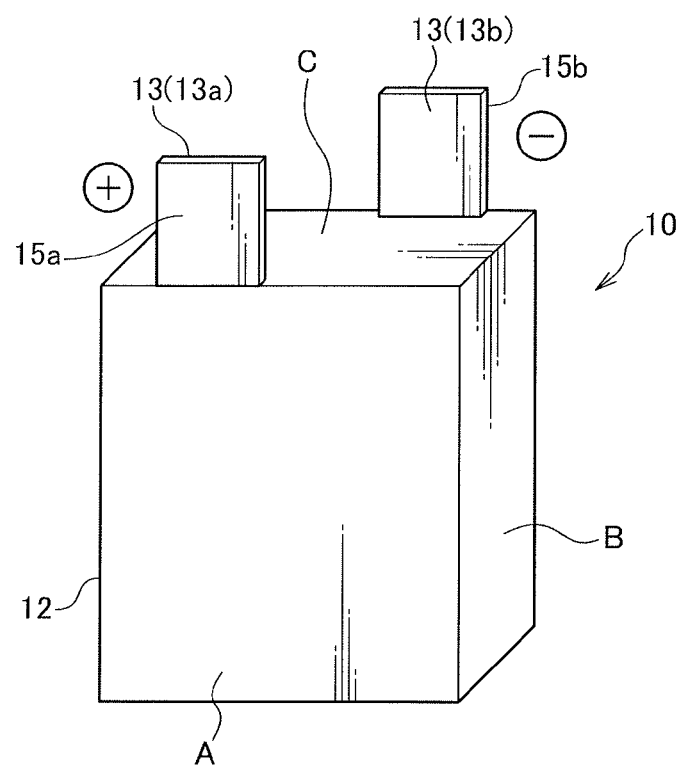
FIG. 1 is a perspective view of a storage cell in a storage module according to a first embodiment of this invention.
Figure 2:
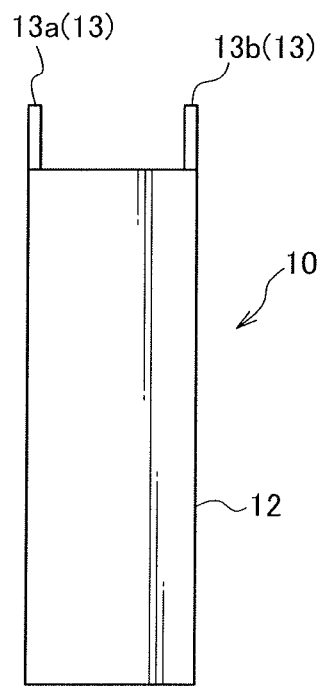
FIG. 2 is a side view of the storage cell.
Figure 3:
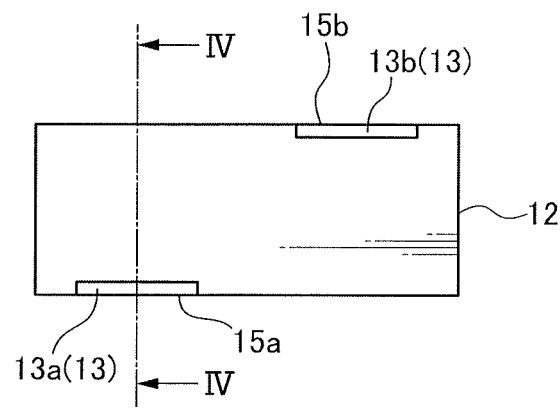
FIG. 3 is a plan view of the storage cell.
Figure 4:
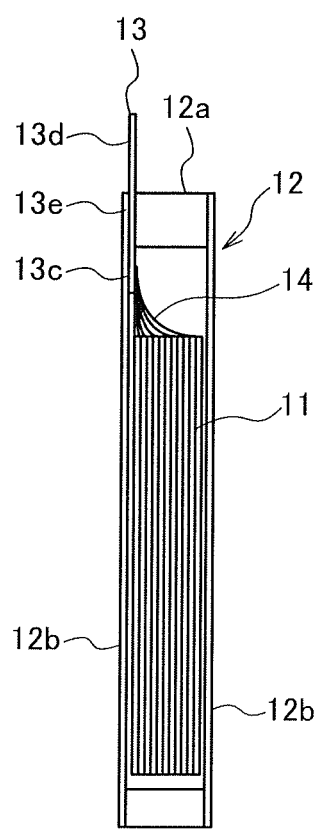
FIG. 4 is a longitudinal sectional view of the storage cell, taken along an IV-IV line in FIG. 3.

The storage cell 10 is constituted by an electric double layer capacitor. As shown in FIG. 4, the storage cell 10 includes a storage unit 11 that stores a charge, a container 12 that houses the storage unit 11, and an electrode terminal 13 that outputs and inputs a charge from and to the storage unit 11.

The storage unit 11 is an angular laminated body including a positive electrode body, a negative electrode body, and a separator interposed between the positive electrode body and the negative electrode body. The positive electrode body and the negative electrode body include an electrode layer that stores a charge, or in other words a polarized electrode, and a collector layer that outputs and inputs the charge, or in other words a collector electrode. As shown in FIG. 4, in the positive electrode body and the negative electrode body, homopolar leads 14 of the collector layers are bundled together, and the electrode terminals 13 of corresponding polarities are connected respectively to resulting bundled portions.

The container 12 is formed in a rectangular parallelepiped angular shape in alignment with an outer shape of the storage unit 11. A chamber that houses the storage unit 11 together with an electrolyte is defined in the interior of the container 12.

A pair of the electrode terminals 13 includes a positive electrode terminal 13a having a joint surface 15a that is substantially coplanar with one of two opposing surfaces of the container 12, and a negative electrode terminal 13b having a joint surface 15b that is substantially coplanar with the other of the two surfaces.

The positive electrode terminal 13a and the negative electrode terminal 13b are respectively formed from metal plate in a shape having a short length. The bundled portions of the homopolar leads 14 of the collector layers are fixed by welding or the like to first end portions 13c of the positive electrode terminal 13a and the negative electrode terminal 13b, which are positioned within the interior chamber of the container 12. Second end portions 13d of the positive electrode terminal 13a and the negative electrode terminal 13b, which project to the outside of the container 12, respectively constitute the joint surface 15a and the joint surface 15b for establishing an electric connection.

The container 12 is a rectangular parallelepiped, and therefore the two opposing surfaces of the container 12 may refer to any of three combinations, namely a front surface A and a back surface, a left side surface B and a right side surface, or an upper surface C and a lower surface. The right side surface and the left side surface B are thus named when the front surface A is viewed from the back surface.

In the container 12, the positive electrode terminal 13a and the negative electrode terminal 13b project upward. Therefore, the two opposing surfaces of the container 12 may refer to either the front surface A and the back surface or the left side surface B and the right side surface, but not to the upper surface C and the lower surface.

In this embodiment, with respect to an arrangement direction of the storage cell 10 in the storage module M10S and a storage module M10SP to be described below, the two opposing surfaces of the container 12 refer to the front surface A and the back surface.

The positive electrode terminal 13a projects above the container 12 from a position near the right side surface side on an upper edge of the front surface A such that the electric connection joint surface 15a is formed to be substantially coplanar with the front surface A of the container 12. The negative electrode terminal 13b, meanwhile, projects above the container 12 from a position near the left side surface B side on an upper edge of the back surface of the container 12 such that the electric connection joint surface 15b is formed to be substantially coplanar with the back surface of the container 12.

As shown in FIG. 4, the container 12 is constituted by a frame body 12a and a pair of film bodies 12b.

The frame body 12a is formed from a resin having a thermal bonding property and an electrical insulating property in a rectangular shape that corresponds to the outer shape of the angular storage unit 11. The frame body 12a is formed in a frame shape having four edge portions, namely an upper edge portion, a lower edge portion, a right edge portion, and a left edge portion, and a region surrounded by the four edge portions is open to the front and the rear.

The film body 12b is a laminate film formed in the shape of a sheet whose shape and size are substantially identical to the front and rear surfaces of the frame body 12a. The film body 12b has a laminated structure constituted by a plurality of resin layers and a metallic intermediate layer. In the film body 12b, a layer on a surface exposed to an inner side of the frame body 12a is formed from resin having a thermal bonding property and an electrical insulating property.

The electrode terminal 13 includes the first end portion 13c projecting to the inner side of the frame body 12a, the second end portion 13d projecting to an outer side of the frame body 12a, and an intermediate portion 13e fixed to one edge portion of the frame body 12a. The intermediate portion 13e of the electrode terminal 13 is integrated with the frame body 12a and the film body 12b via a thermal bonding resin used to perform heat sealing processing, to be described below, and supported fixedly in a predetermined position of the container 12.

In the heat sealing processing, first, the intermediate portion 13e of one electrode terminal 13 is overlapped onto a front surface of the upper edge portion of the frame body 12a and the film body 12b is placed thereon. Pressure and heat are then applied to a peripheral edge portion of the film body 12b from the front surface side of the frame body 12a using a heat sealer. Further, the intermediate portion 13e of the other electrode terminal 13 is overlapped onto a back surface of the upper edge portion of the frame body 12a and the film body 12b is placed thereon. Pressure and heat are then applied to the peripheral edge portion of the film body 12b from the back surface side of the frame body 12a using the heat sealer.

When pressure and heat are applied by the heat sealer, the thermal bonding resin of the film body 12b and the thermal bonding resin of the frame body 12a are fused. Thereafter, following heat discharge, the thermal bonding resin coagulates, whereby the film body 12b and the frame body 12a are sealed without gaps. Further, the intermediate portion 13e of the electrode terminal 13 is enveloped in the coagulated thermal bonding resin such that a periphery thereof is sealed without gaps. Using a pair of heat sealers, the film bodies 12b can be thermally bonded to both the front surface and the back surface of the upper edge portion simultaneously.

As regards electrolyte injection into the container 12, an unprocessed part not subjected to thermal bonding is left during the heat sealing processing, and the electrolyte is charged into the interior of the container through the unprocessed part. Following injection of the electrolyte, the unprocessed part is sealed by heat sealing processing.

Through the processes described above, the storage cell 10 including the positive electrode terminal 13a and the negative electrode terminal 13b can be manufactured simply, easily, and efficiently. The storage cell 10 includes a gas purging valve, not shown in the figures, to keep an internal pressure of the container 12 at or below a predetermined level.

Next, referring mainly to FIGS. 5A to 5C, a relationship between a length of a positive electrode side lead and a length of a negative electrode side lead in the storage unit 11 will be described.

The bundled portion of the leads 14 extending from the collector layers of the positive electrode bodies in the storage unit 11 is joined to the first end portion of the positive electrode terminal 13a disposed on the front surface A side of the container 12. The bundled portion of the leads 14 extending from the collector layers of the negative electrode bodies in the storage unit 11 is joined to the first end portion 13c of the negative electrode terminal 13b disposed on the back surface side of the container 12. Therefore, in a unit cell constituted by a group of the positive electrode body, the negative electrode body, and the separator, which serves as a smallest constituent unit of the storage unit 11, the positive electrode side collector layer lead 14 having the greatest length corresponds to the negative electrode side collector layer lead 14 having the shortest length.

More specifically, in each unit cell, a sum of a positive electrode side collector layer lead length and a negative electrode side collector layer lead length is uniform and does not vary depending on a lamination position of the storage unit 11. Therefore, by disposing the positive electrode terminal 13a and the negative electrode terminal 13b on either lamination direction end of the storage unit 11, an internal resistance of each unit cell can be made even.

Figure 5A:
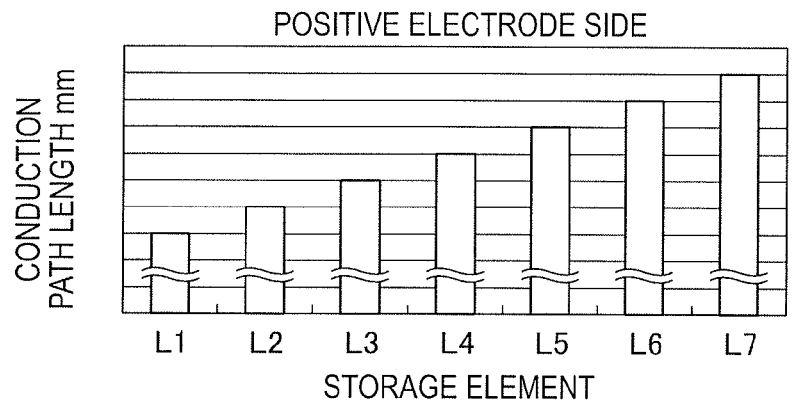
FIG. 5A is a graph showing examples of lengths of a positive electrode side lead of a storage unit.
Figure 5B:
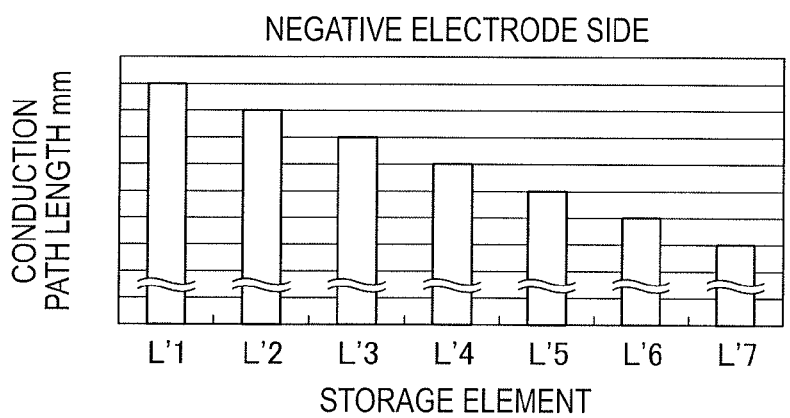
FIG. 5B is a graph showing examples of lengths of a negative electrode side lead of the storage unit.
Figure 5C:
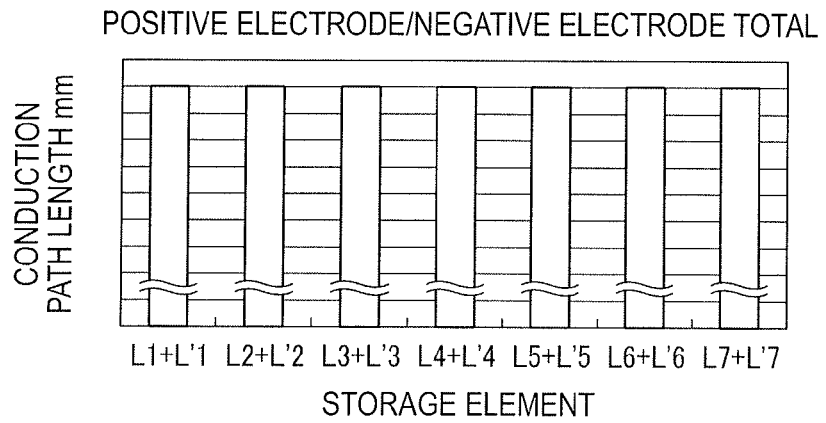
FIG. 5C is a graph showing examples of sum totals of the length of the positive electrode side lead and the length of the negative electrode side lead.

FIG. 5A shows lengths of positive electrode side leads L1 to L7 in respective unit cells. FIG. 5B shows lengths of negative electrode side leads L1' to L7' in respective unit cells. FIG. 5C shows lengths L1+L1' to L7+L7'. The numerals 1 to 7 denote a lamination sequence of the unit cells, or in other words lamination positions.

In the storage module M10S and the storage module M10SP formed from the plurality of storage cells 10, it is necessary to provide two types of storage cells, namely a storage cell 10A and a storage cell 10B, in which the positive electrode terminal 13a and the negative electrode terminal 13b are disposed differently.

Next, referring to FIGS. 6 to 9, the storage module M10S, in which pluralities of the storage cells 10A and the storage cells 10B are arranged in a row in the lamination direction of the storage unit 11 and connected in series, will be described.

In the storage cell 10A, the positive electrode terminal 13a and the negative electrode terminal 13b are disposed similarly to the storage cell 10 shown in FIGS. 1 to 4. In the storage cell 10B, the positive electrode terminal 13a projects above the container 12 from a position near the left side surface B side on the upper edge of the back surface of the container 12, while the negative electrode terminal 13b projects above the container 12 from a position near the right side surface side on the upper edge of the front surface A of the container. Apart from this difference in the arrangement of the positive electrode terminal 13a and the negative electrode terminal 13b, the storage cell 10B is constituted similarly to the storage cell 10A.

As shown in FIG. 6, in the storage module M10S, the storage cells are disposed alternately in order of the storage cell 10A, the storage cell 10B, the storage cell 10A.

Figure 7:
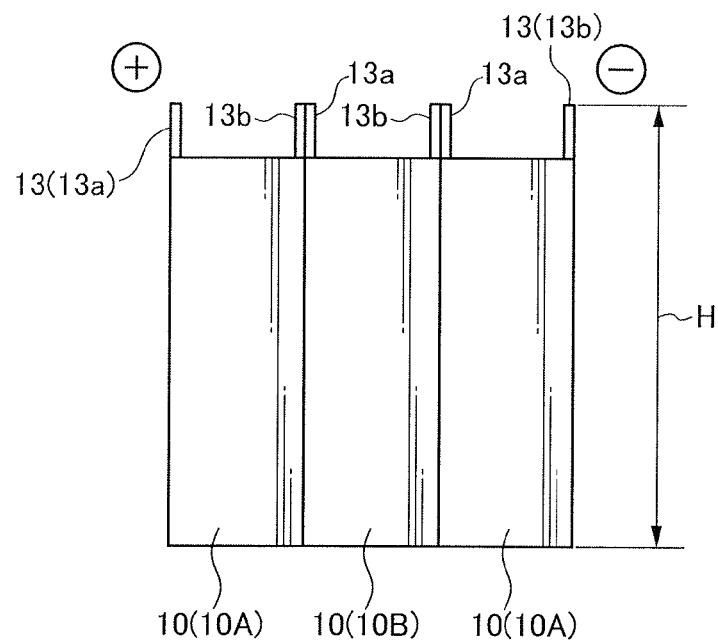
FIG. 7 is a side view of the storage module seen from the direction of an arrow in FIG. 6.
Figure 8:
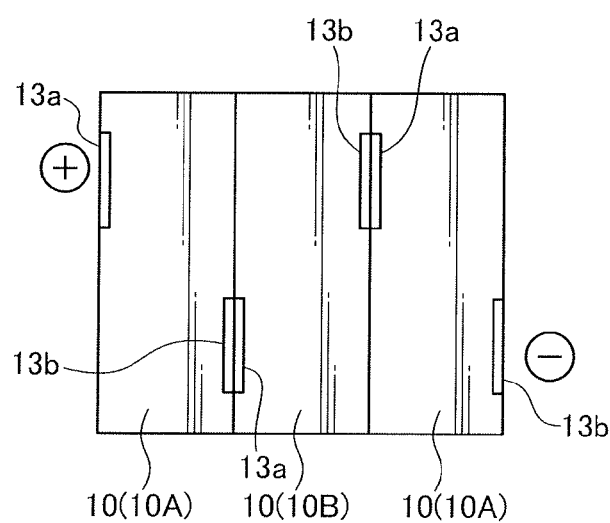
FIG. 8 is a plan view of the storage module.

As shown in FIGS. 7 and 8, the positive electrode terminal 13a of the storage cell 10B and the negative electrode terminal 13b of the storage cell 10A overlap in identical positions between the storage cell 10A and the storage cell 10B. Similarly, the negative electrode terminal 13b of the storage cell 10B and the positive electrode terminal 13a of the storage cell 10A overlap in identical positions.

Further, the positive electrode terminal 13a of the storage cell 10B and the negative electrode terminal 13b of the storage cell 10A overlap in identical positions between the storage cell 10B and another storage cell 10A. Similarly, the negative electrode terminal 13b of the storage cell 10B and the positive electrode terminal 13a of the storage cell 10A overlap in identical positions.

Figure 9:
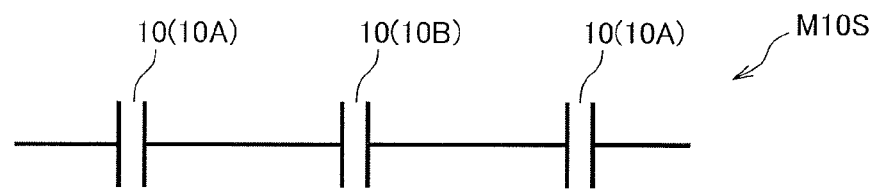
FIG. 9 is a circuit configuration diagram of the storage module.
Figure 10:
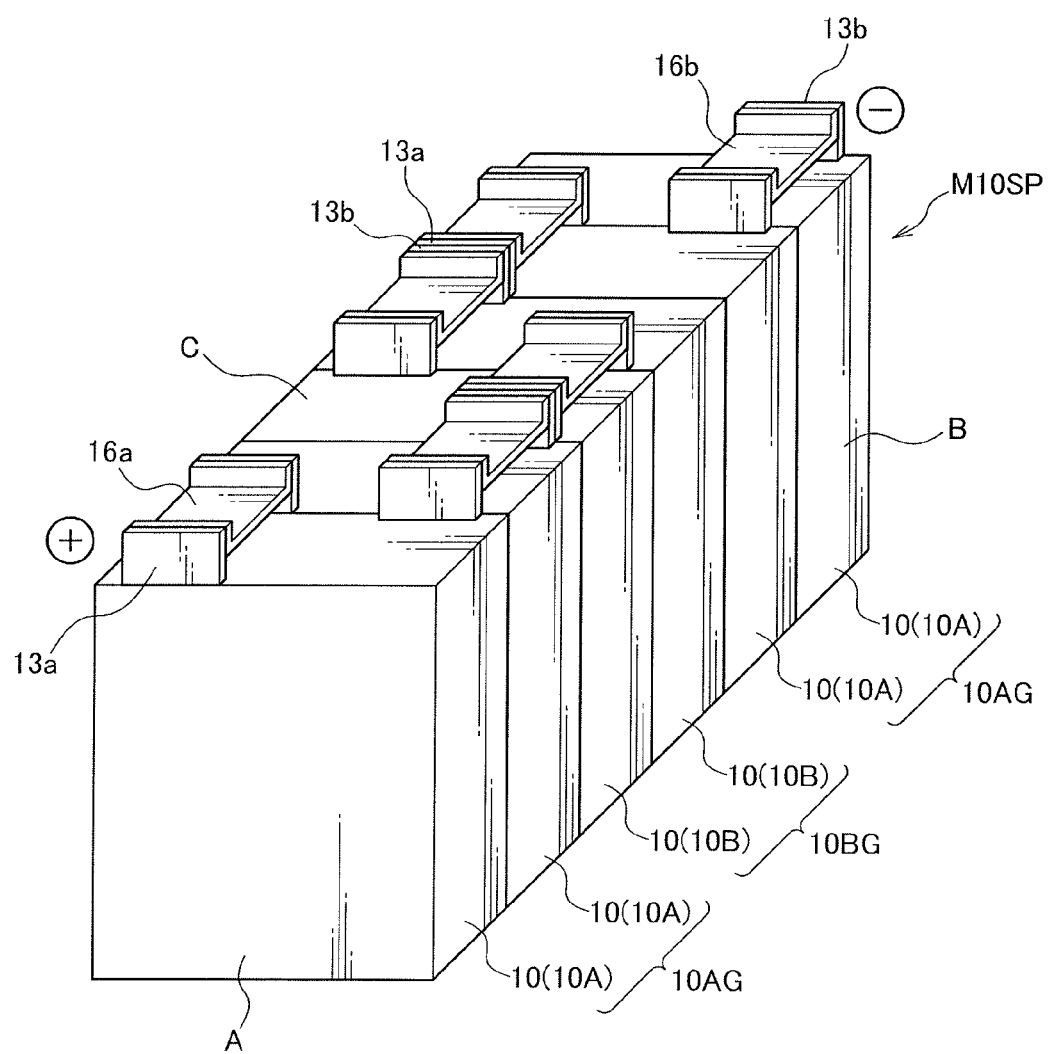
FIG. 10 is a perspective view of a storage module according to a second embodiment of this invention.

In the plurality of storage cells 10A and storage cells 10B arranged in a row, the negative electrode terminal 13b of the storage cell 10A and the positive electrode terminal 13a of the storage cell 10B are electrically connected, and the negative electrode terminal 13b of the storage cell 10B and the positive electrode terminal 13a of another storage cell 10A are electrically connected. In other words, as shown in FIG. 9, the plurality of storage cells 10 are electrically connected in series.

The storage cell 10 includes the positive electrode terminal 13a having the joint surface 15a that is substantially coplanar with one of the front surface A and the back surface of the container 12, and the negative electrode terminal 13b having the joint surface 15b that is substantially coplanar with the other surface. Therefore, when the plurality of storage cells 10A and storage cells 10B are laminated alternately, the joint surface 15a of the positive electrode terminal 13a and the joint surface 15b of the negative electrode terminal 13b overlap adjacently.

Figure 33:
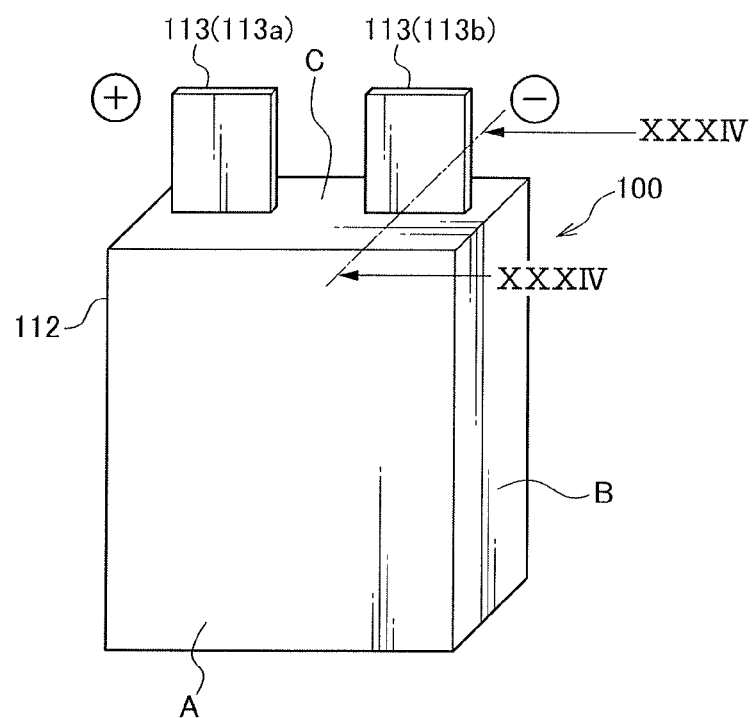
FIG. 33 is a perspective view of a storage cell according to the related art.
Figure 34:
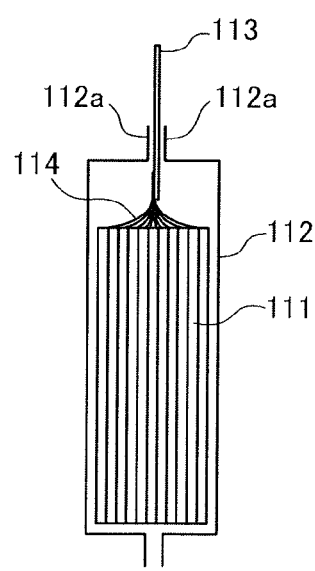
FIG. 34 is a longitudinal sectional view of the storage module, taken along an XXXIV-XXXIV line in FIG. 33.
Figure 35:
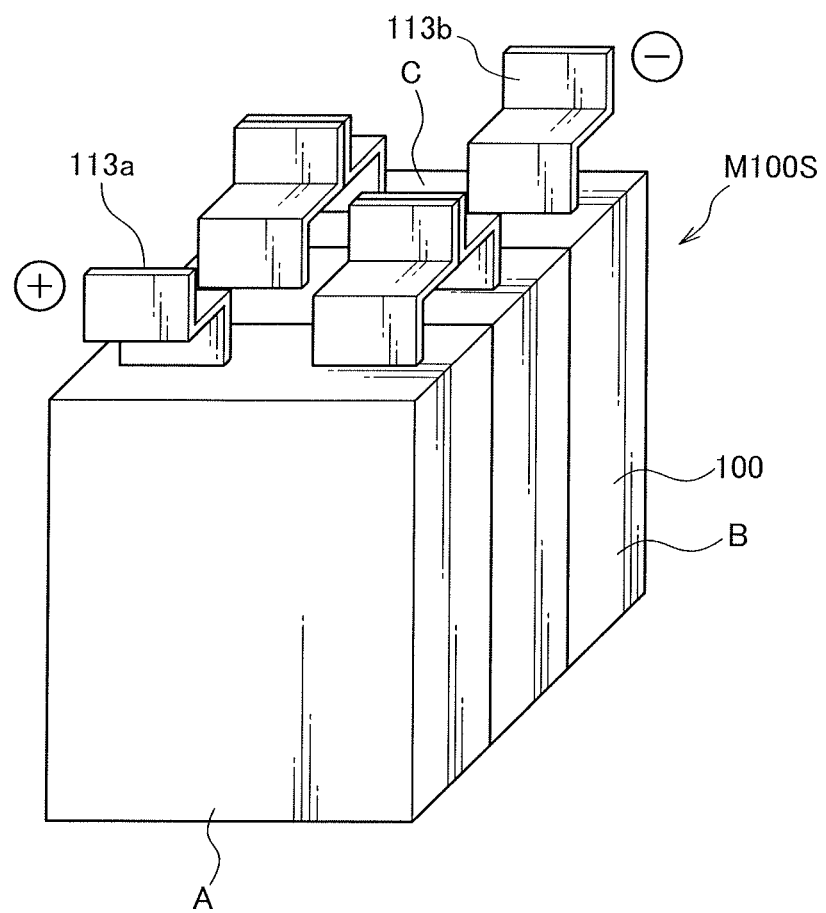
FIG. 35 is a perspective view of a storage module formed using a plurality of storage cells, according to the related art.

Hence, in the storage cell 10, in contrast to the conventional storage cell 100 shown in FIGS. 33 to 35, there is no need to bend the positive electrode terminal 13a and the negative electrode terminal 13b in order to join and electrically connect the electrode terminals 13 to each other. As a result, the electrode terminals 13 can be electrically connected to each other simply and easily between the storage cells 10. In other words, using the storage cell 10, the storage module M10S can be assembled simply, easily, and efficiently.

Further, since there is no need to bend the electrode terminals 13 of the respective storage cells 10, the length of the part of each electrode terminal 13 that projects from the container 12 can be shortened. As a result, a height of the storage module M10S, indicated by a symbol H in FIG. 7, can be reduced. Accordingly, a storage capacity of the storage module M10S per unit volume is improved. Further, by reducing the length of the electrode terminal 13, the electric resistance of the electrode terminal 13 can be reduced, enabling a reduction in an amount of generated heat accompanying charging/discharging.

In the adjacent storage cell 10A and storage cell 10B at this time, the positive electrode terminal 13a and the negative electrode terminal 13b are formed in plane symmetry about a contact surface between the storage cell 10A and the storage cell 10B. Therefore, the positions of the positive electrode terminal 13a and the negative electrode terminal 13b do not shift even when further storage cells 10A and storage cells 10B are laminated. As a result, the storage module M10S can be formed using only two types of storage cell, namely the storage cell 10A and the storage cell 10B.

In the case of the conventional storage cell 100 shown in FIGS. 33 to 35, the length of the part of the electrode terminal 113 that projects from the container 112 is a sum of a length of a part that projects from the container 112 substantially perpendicularly to the lamination direction of the storage unit 111, a length of a part that extends substantially parallel to the lamination direction of the storage unit 111, and a length of a part forming a joint surface between the electrode terminals 113. In the storage cell 10 according to this invention, the length of the part of the electrode terminal 13 that projects from the container 12 corresponds principally only to the length of the part forming the joint surface between the electrode terminals 13.

Next, referring to FIGS. 10 to 16, the storage module M10SP according to a second embodiment of this invention will be described.

In the storage module M10SP, a plurality of identical storage cells 10A and storage cells 10B to those of the first embodiment are arranged in order of the storage cell 10A, the storage cell 10A, the storage cell 10B, the storage cell 10B, the storage cell 10A, the storage cell 10A. The adjacent pair of storage cells 10A form a storage cell group 10AG, and the adjacent pair of storage cells 10B form a storage cell group 10BG.

The pair of adjacent storage cells 10A in the storage cell group 10AG and the pair of adjacent storage cells 10B in the storage cell group 10BG are electrically connected in parallel using a bus bar 16a and a bus bar 16b, respectively. The adjacent storage cell group 10AG and storage cell group 10BG are electrically connected in series by direct contact between the positive electrode terminal 13a and the negative electrode terminal 13b.

Between the pair of adjacent storage cells 10A in the storage cell group 10AG and the pair of adjacent storage cells 10B in the storage cell group 10BG, the positive electrode terminals 13a are electrically connected to each other by welding or the like via the bus bar 16a. Similarly, the negative electrode terminals 13b are electrically connected to each other by welding or the like via the bus bar 16b.

Between the storage cell group 10AG and the storage cell group 10BG, the electrode terminal 13 of the storage cell group 10AG and the electrode terminal 13 of the storage cell group 10BG overlap in identical positions on a surface where the containers 12 overlap, i.e. an adjacent surface between the storage cell 10A and the storage cell 10B.

Figure 11:
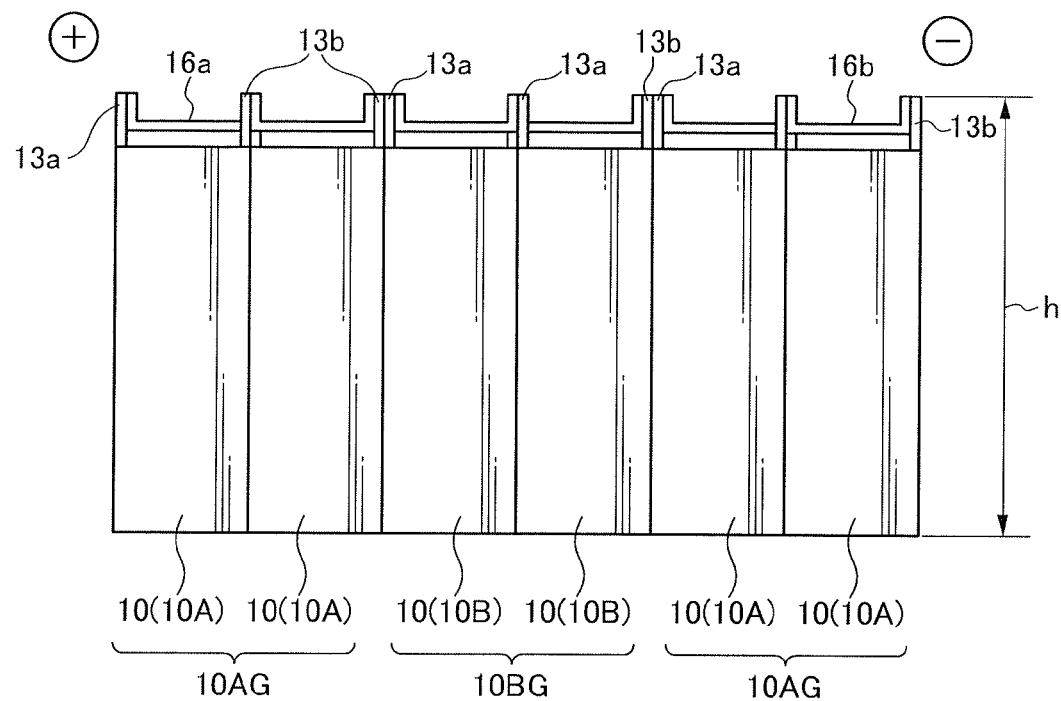
FIG. 11 is a side view of the storage module.
Figure 12:
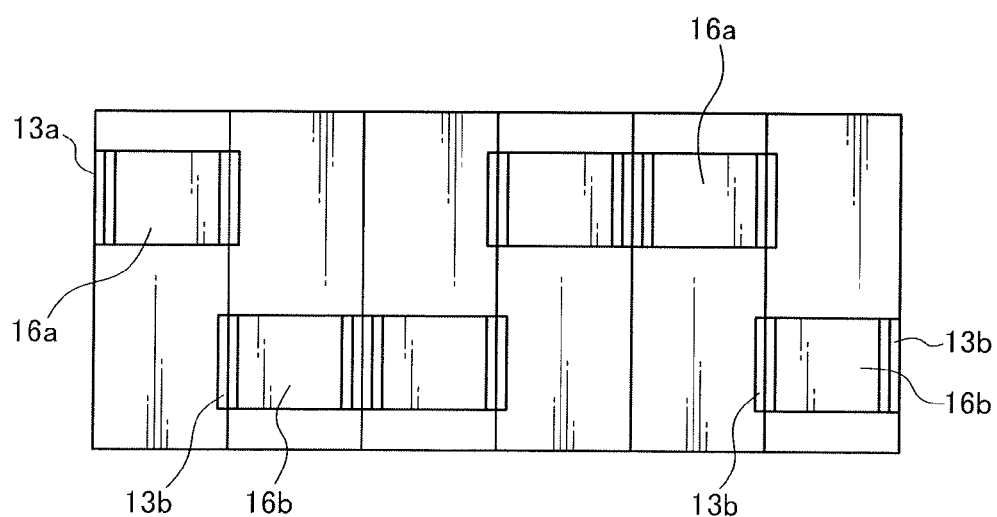
FIG. 12 is a plan view of the storage module.
Figure 13:
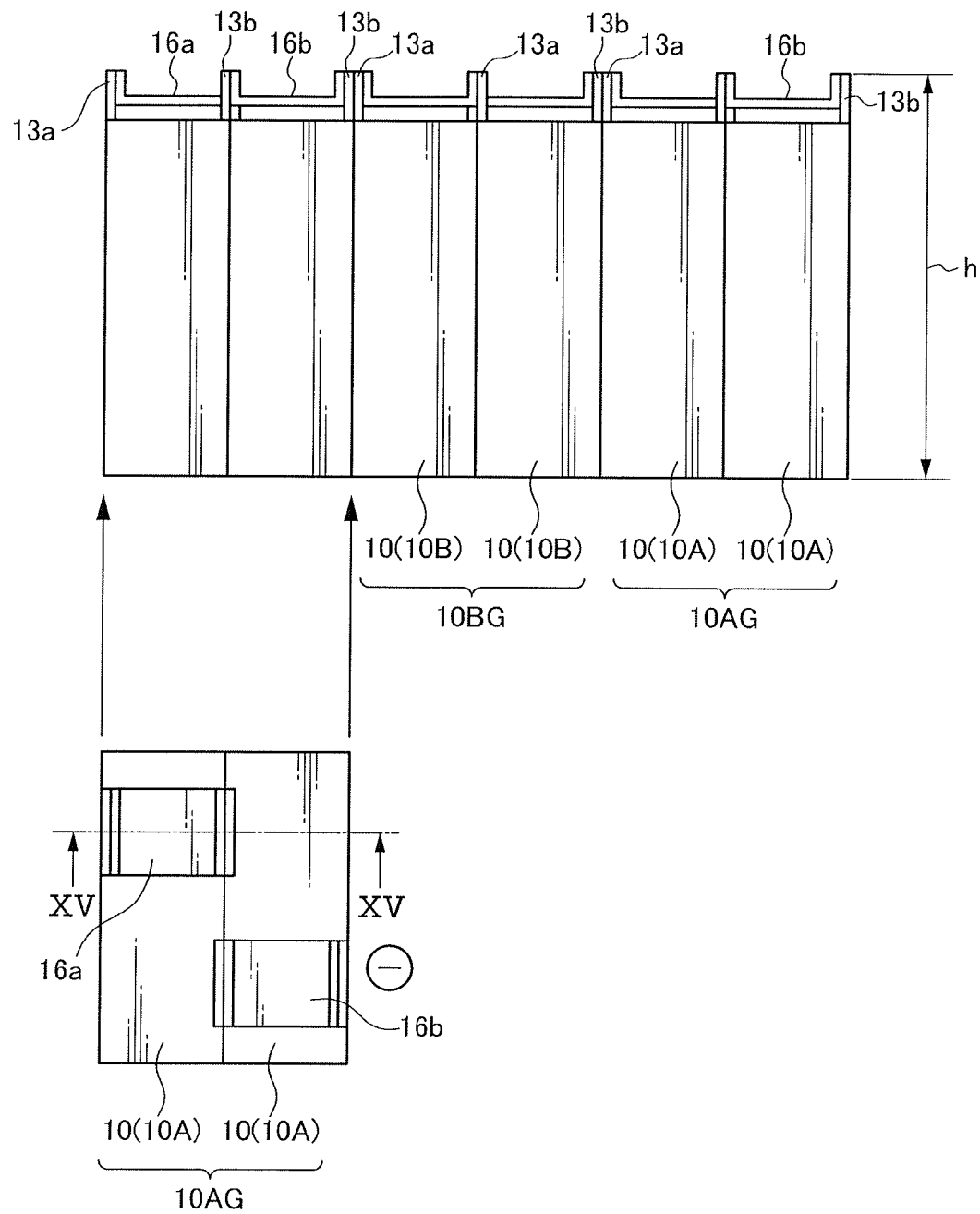
FIG. 13 is a view illustrating the storage module in an assembled condition.
Figure 14:
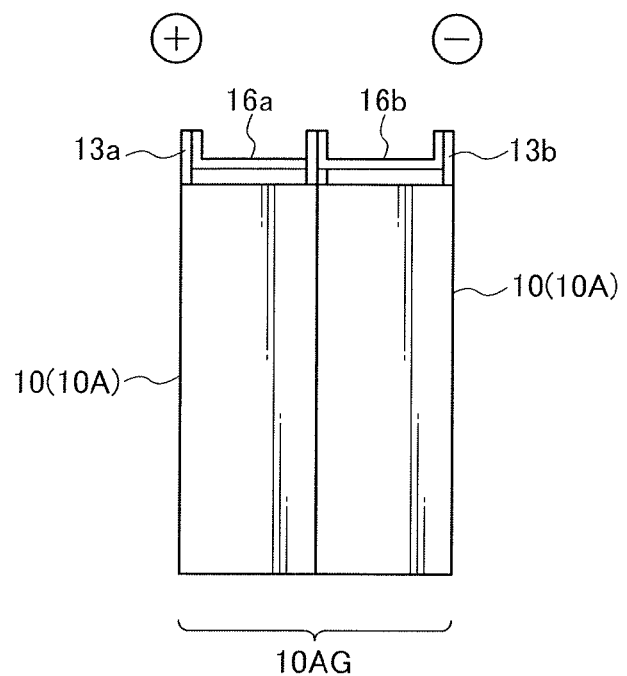
FIG. 14 is a view illustrating a process of assembling the storage module.
Figure 15:
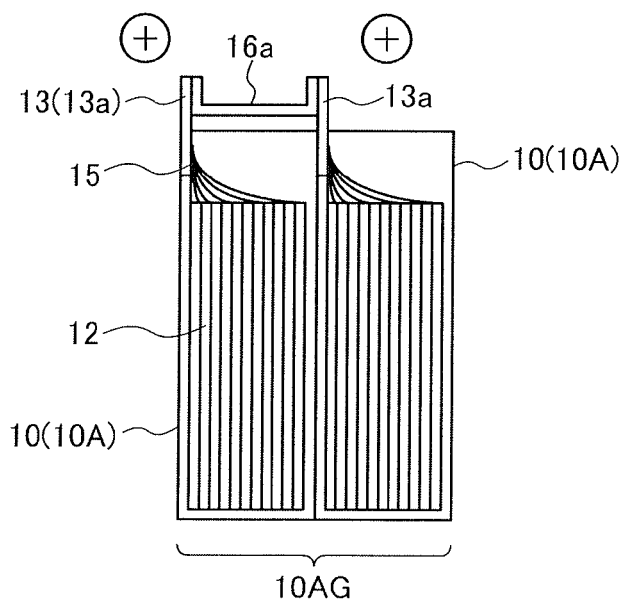
FIG. 15 is a longitudinal sectional view of the storage module, taken along an XV-XV line in FIG. 13.
Figure 16:
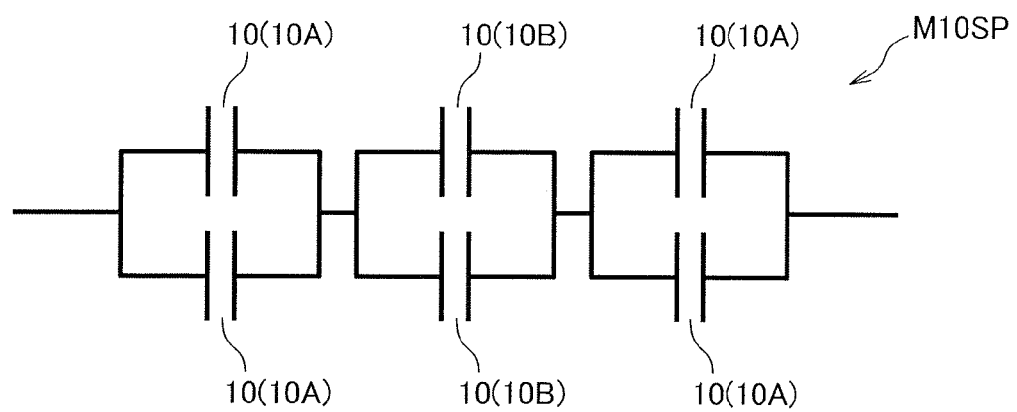
FIG. 16 is a circuit configuration diagram of the storage module.

As shown in FIGS. 11 and 12, the negative electrode terminal 13b of the storage cell 10B and the positive electrode terminal 13a of the storage cell 10A that is adjacent to the storage cell 10B are electrically connected by welding or the like. FIG. 16 is a circuit configuration diagram of the storage module M10SP.

Hence, likewise in the storage module M10SP in which the plurality of storage cells 10 are connected in series/parallel, the storage cell 10 includes the positive electrode terminal 13a having the joint surface 15a and the negative electrode terminal 13b having the joint surface 15b, and therefore the storage cells 10 can be joined and electrically connected simply, easily, and efficiently.

Further, the electrode terminals 13 of the respective storage cells 10 do not have to be bent in order to join and electrically connect the electrode terminals 13 to each other, and therefore the length of the part of each electrode terminal 13 that projects from the container 12 can be shortened. As a result, a height of the storage module M10SP, indicated by a symbol h in FIG. 11, can be reduced. Accordingly, the storage capacity of the storage module M10S per unit volume is improved.

Furthermore, by reducing the length of the electrode terminal 13, the electric resistance of the electrode terminal 13 can be reduced, enabling a large reduction in the amount of generated heat accompanying charging/discharging.

In the adjacent storage cell group 10AG and storage cell group 10BG at this time, the positive electrode terminal 13a and the negative electrode terminal 13b are formed in plane symmetry about a contact surface between the storage cell group 10AG and the storage cell group 10BG. Therefore, the positions of the positive electrode terminal 13a and the negative electrode terminal 13b do not shift even when further storage cell groups 10AG and storage cell groups 10BG are laminated. As a result, the storage module M10SP can be formed using only two types of storage cell, namely the storage cell 10A and the storage cell 10B.

Next, referring to FIGS. 17 and 18, modified examples of the storage cell will be described.

Figure 17:
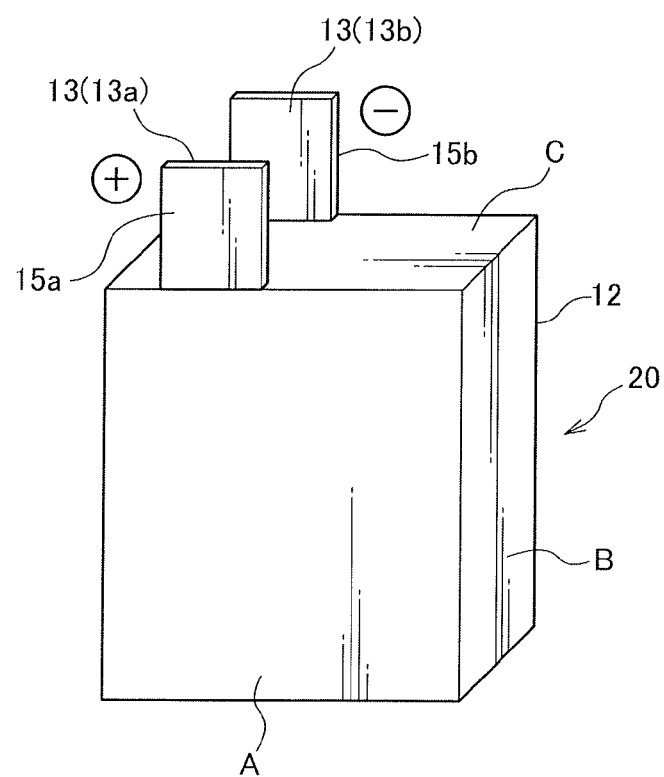
FIG. 17 is a perspective view showing a modified example of the storage cell.
Figure 18:
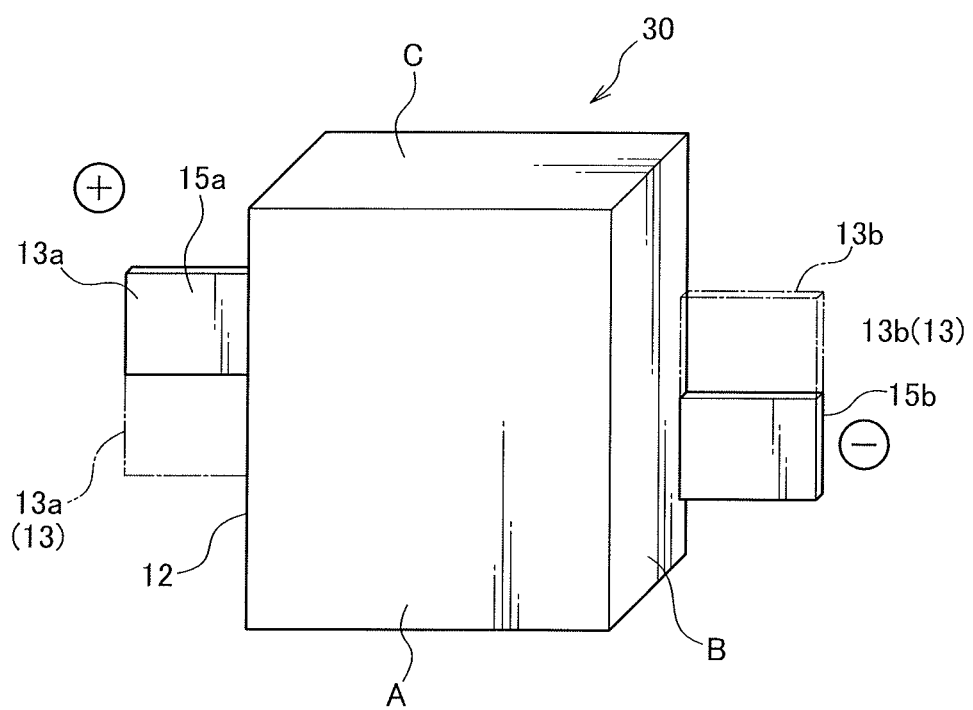
FIG. 18 is a perspective view showing another modified example of the storage cell.

In a storage cell 20 and a storage cell 30 shown in FIGS. 17 and 18, sites that are functionally identical to the storage cell 10 shown in FIGS. 1 to 4 have been allocated identical reference symbols.

The storage cell 20 shown in FIG. 17 includes, as the pair of electrode terminals 13, a positive electrode terminal 13a having a joint surface 15a that is substantially coplanar with the front surface A of the container 12 and a negative electrode terminal 13b having a joint surface 15b that is substantially coplanar with the back surface. A storage module is constructed by laminating the back surface of the container 12 so as to overlap the front surface A of another container 12.

The positive electrode terminal 13a projects above the container 12 from a position near the right side surface side of the container 12 on the upper edge of the front surface A of the container 12 such that the electric connection joint surface 15a is substantially coplanar with the front surface A of the container 12. The negative electrode terminal 13b, meanwhile, projects above the container 12 from a position near the right side surface side of the container 12 on the upper edge of the back surface of the container 12 such that the electric connection joint surface 15b is substantially coplanar with the back surface of the container 12.

The storage cell 20 is formed such that the positive electrode terminal 13a and the negative electrode terminal 13b are disposed opposite either end of the lamination direction of the storage unit 11. When a plurality of the storage cells 20 are laminated such that the front surface A and the back surface contact each other, heteropolar electrode terminals 13 of the storage cells 20 are adjacent to each other. These electrode terminals 13 can be electrically connected simply, easily, and efficiently by welding or the like.

Hence, in a storage module formed by electrically connecting a plurality of the storage cells 20 in series, only a single type of storage cell, i.e. the illustrated storage cell 20, is required. Since there is no need to bend the electrode terminals 13 in order to join and electrically connect the storage cells 20 to each other, similar effects to those of the storage cell 10 and the storage module M10S are obtained.

The storage cell 30 shown in FIG. 18 includes, as the pair of electrode terminals 13, a positive electrode terminal 13a having a joint surface 15a that is substantially coplanar with one of two opposing surfaces of the container 12 and a negative electrode terminal 13b having a joint surface 15b that is substantially coplanar with the other opposing surface. With respect to the arrangement direction of the storage cell 30 in a storage module, the two opposing surfaces of the container 12 refer to the front surface A and the back surface.

The positive electrode terminal 13a projects to the right of the container 12 from a position near the upper surface C side on a right edge of the front surface A of the container 12 such that the electric connection joint surface 15a is formed to be substantially coplanar with the front surface A of the container 12. The negative electrode terminal 13b, meanwhile, projects to the left of the container 12 from a position near the lower surface side on a left edge of the back surface of the container 12 such that the electric connection joint surface 15b is formed to be substantially coplanar with the back surface.

To form a similar circuit to that of the storage modules M10S and M10SP, two types of storage cells, namely a storage cell 30A and a storage cell 30B in which the pair of electrode terminals 13 are disposed differently, are used as the storage cell 30, similarly to the storage cell 10.

As shown in FIG. 18, in the storage cell 30A, the pair of electrode terminals 13 are disposed as described above. In the storage cell 30B, the positive electrode terminal 13a projects to the left of the container 12 from a position near the lower surface side on the left edge of the front surface A of the container 12.

The negative electrode terminal 13b of the storage cell 30B, meanwhile, projects to the right of the container 12 from a position near the upper surface C side on the right edge of the back surface of the container 12. Pluralities of the storage cell 30A and the storage cell 30B are arranged similarly to the storage cell 10, and by joining the storage cells in series or in series/parallel, a storage module can be constructed simply, easily, and efficiently.

As shown by a dot-dash line in the figure, the positive electrode terminal 13a and the negative electrode terminal 13b of the storage cell 30 may be disposed to project to the sides of the container 12 from the center of the left edge and the right edge of the front surface and the back surface of the container 12. In this case, by arranging the storage cells 30 while reversing the front and back surfaces of the storage cell 30, or in other words the front and rear surfaces of the container 12, alternately during the assembly process of the storage module, the electrode terminals 13 between adjacent storage cells 30 overlap in identical positions. As a result, only the single type of storage cell 30 is required.

Next, referring to FIGS. 19 to 22, a storage module M40S according to a third embodiment of this invention will be described.

In a storage cell 40 of the storage module M40S shown in FIGS. 19 to 22, sites that are functionally identical to the storage cell 10 shown in FIGS. 1 to 4 have been allocated identical reference symbols.

The storage cell 40 includes, as the pair of electrode terminals 13, a positive electrode terminal 13a having a joint surface 15a that is substantially coplanar with one of two opposing surfaces of the container 12 and a negative electrode terminal 13b having a joint surface 15b that is substantially coplanar with the other opposing surface. With respect to the arrangement direction of the storage cell 40 in the storage module M40S, the two opposing surfaces of the container 12 refer to the front surface A and the back surface.

The positive electrode terminal 13a projects toward a front portion of the upper surface C of the container 12 from a position near the right side surface side on the upper edge of the front surface A of the container 12 such that the electric connection joint surface 15a is formed to be substantially coplanar with the front surface A of the container 12. The negative electrode terminal 13b, meanwhile, projects toward a rear portion of the upper surface C of the container 12 from a position near the left surface B side on the upper edge of the back surface such that the electric connection joint surface 15b is formed to be substantially coplanar with the back surface.

Figure 22:
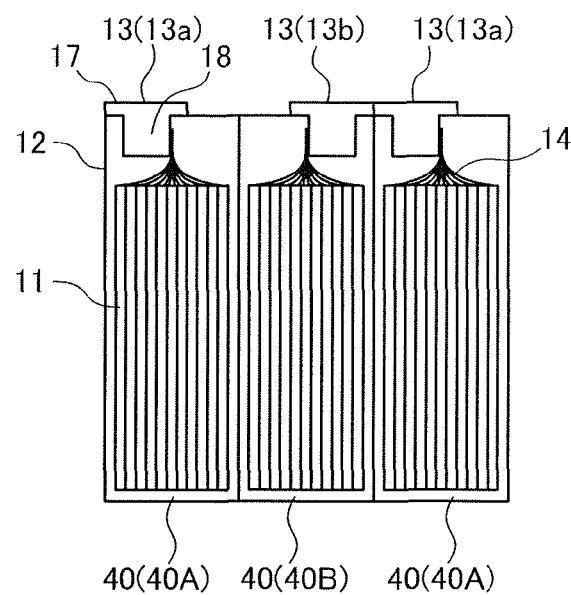
FIG. 22 is a longitudinal sectional view of the storage module, taken along an XXII-XXII line in FIG. 21.

Similarly to the storage cell 10 described above, the container 12 is constituted by a frame body and a film body. As shown in FIG. 22, each electrode terminal 13 is constituted by a head portion 17 and a leg portion 18, which are insert-molded while molding the frame body.

The head portion 17 projects from an upper surface of the frame body, or in other words the upper surface of the container 12. The joint surface 15a that is substantially coplanar with the front surface A of the container 12 is formed on the head portion 17 by a front end surface of the head portion 17 positioned on the front surface A side of the container 12. The joint surface 15b that is substantially coplanar with the back surface of the container 12, meanwhile, is formed on the head portion 17 by a rear end surface of the head portion positioned on the back surface side of the container 12.

The leg portion 18 includes a base end portion buried in the frame body, and a tip end portion projecting to the inner side of the frame body. As shown in FIG. 22, the bundled portion of the collector layer leads 14 of the storage unit is fixed to the tip end portion by welding or the like.

To construct the storage module M40S, two types of storage cells, namely a storage cell 40A and storage cell 40B in which the pair of electrode terminals 13 are disposed differently, are used as the plurality of storage cells 40, similarly to the storage cell 10.

In the storage cell 40A, the head portion 17 of the positive electrode terminal 13a projects toward the rear portion of the upper surface C of the container 12 from a position near the right side surface side on the upper edge of the front surface A of the container 12 such that the electric connection joint surface 15a is formed on a front end surface thereof to be substantially coplanar with the front surface A of the container 12. The head portion 17 of the negative electrode terminal 13b, meanwhile, projects toward the front portion of the upper surface C of the container 12 from a position near the left side surface B side on the upper edge of the back surface of the container 12 such that the electric connection joint surface 15b is formed on a rear end surface thereof to be substantially coplanar with the back surface of the container 12.

In the storage cell 40B, the head portion 17 of the positive electrode terminal 13a projects toward the front portion of the upper surface C of the container 12 from a position near the left side surface B side on the upper edge of the front surface A of the container 12 such that the electric connection joint surface 15a is formed on a front end surface thereof to be substantially coplanar with the front surface A of the container 12. The head portion 17 of the negative electrode terminal 13b, meanwhile, projects toward the rear portion of the upper surface C of the container 12 from a position near the right side surface side on the upper edge of the back surface of the container 12 such that the electric connection joint surface 15a is formed on a rear end surface thereof to be substantially coplanar with the back surface of the container 12.

Figure 19:
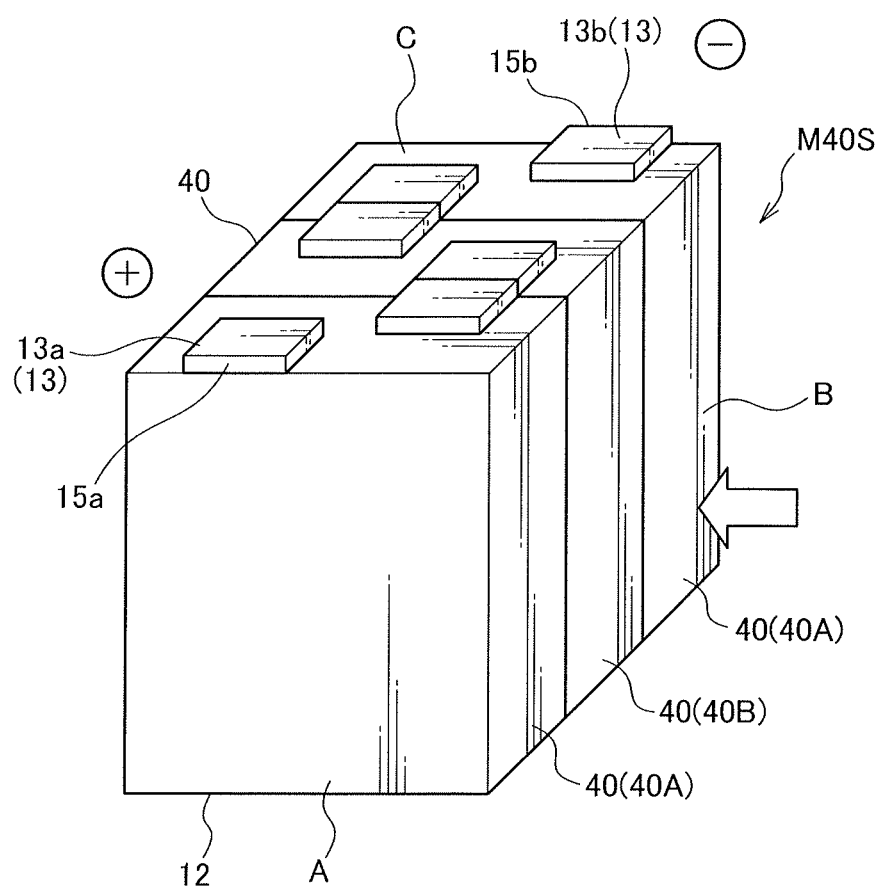
FIG. 19 is a perspective view of a storage module according to a third embodiment of this invention.
Figure 20:
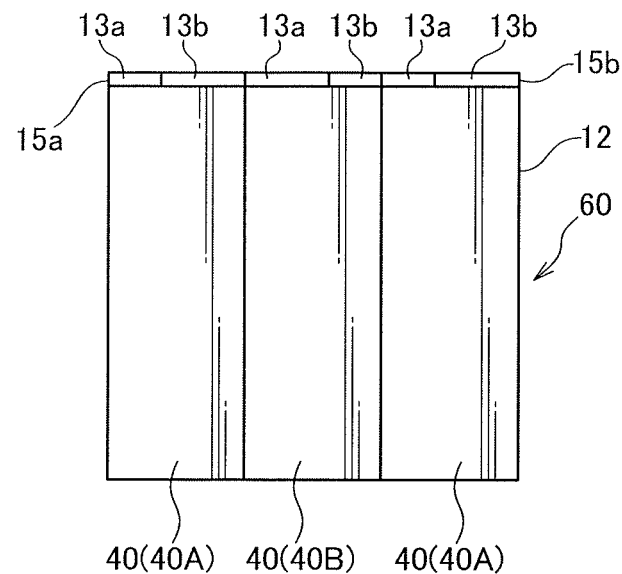
FIG. 20 is a side view of the storage module.

As shown in FIG. 19, in the storage module M40S, the storage cells 40 are arranged alternately in order of the storage cell 40A, the storage cell 40B, the storage cell 40A.

Figure 21:
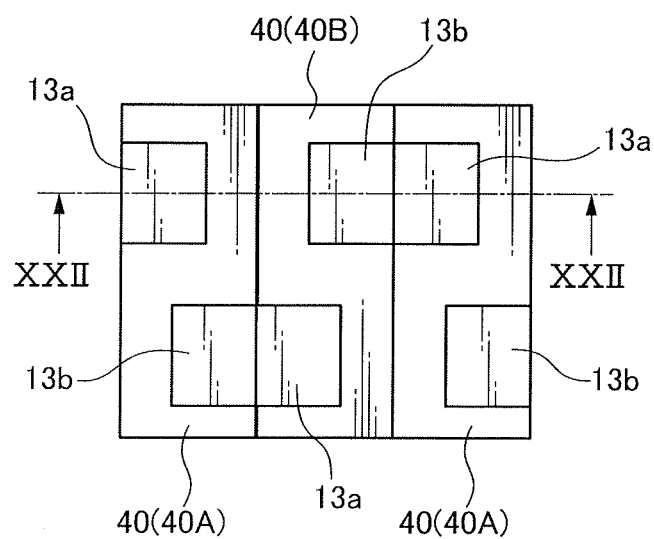
FIG. 21 is a plan view of the storage module.

As shown in FIGS. 19 and 21, the negative electrode terminal 13b of one storage cell 40A and the positive electrode terminal 13a of the storage cell 40B overlap in identical positions between the storage cell 40A and the storage cell 40B. Similarly, the positive electrode terminal 13a of the storage cell 40A and the negative electrode terminal 13b of the storage cell 40B overlap in identical positions.

Further, the negative electrode terminal 13b of the storage cell 40B and the positive electrode terminal 13a of the storage cell 40A overlap in identical positions between the storage cell 40B and another storage cell 40A. Similarly, the positive electrode terminal 13a of the storage cell 40B and the negative electrode terminal 13b of the storage cell 40A overlap in identical positions.

In the plurality of storage cells 40A and storage cells 40B arranged in a row, the negative electrode terminal 13b of the storage cell 40A and the positive electrode terminal 13a of the storage cell 40B are electrically connected by welding or the like via the joint surface 15b and the joint surface 15a. Further, the negative electrode terminal 13b of the storage cell 40B and the positive electrode terminal 13a of another storage cell 40A are electrically connected by welding or the like via the joint surface 15b and the joint surface 15a. In other words, the plurality of storage cells 10 are electrically connected in series.

The storage cell 40 includes the positive electrode terminal 13a having the joint surface 15a that is substantially coplanar with one of the two opposing surfaces of the container 12 and the negative electrode terminal 13b having the joint surface 15b that is substantially coplanar with the other opposing surface. Therefore, when the plurality of storage cells 40 are arranged such that the containers 12 overlap each other in an opposing direction of the two opposing surfaces with which the joint surface 15a and the joint surface 15b of the positive electrode terminal 13a and the negative electrode terminal 13b are substantially coplanar, opposite poles of the electrode terminals 13 are adjacent to each other between the storage cells 40.

Hence, in contrast to the conventional storage cell 110 shown in FIGS. 33 to 35, there is no need in the storage cell 40 to bend the electrode terminals 13 in order to connect the electrode terminals 13 electrically, and as a result, the electrode terminals 13 between the storage cells 40A and the storage cells 40B can be electrically connected simply and easily. In other words, using the storage cell 40, the storage module M40S can be assembled simply, easily, and efficiently.

Further, in the storage cell 40, the head portion 17 of each electrode terminal 13 is formed such that the projecting part of the plate-shaped electrode terminal 13 of the storage cell 10 lies flat on the upper surface C of the container 12, and only a thickness of the head portion 17 projects from the upper surface C of the container 12. As a result, a volume occupied by the storage cell 40 and the storage module is reduced. Therefore, in comparison with the conventional storage cell 110 shown in FIGS. 33 to 35, reductions in both electric resistance and the amount of heat generation accompanying charging/discharging can be achieved.

Next, referring to FIG. 23, a storage cell 50 and a storage module according to a fourth embodiment of this invention will be described.

Figure 23:
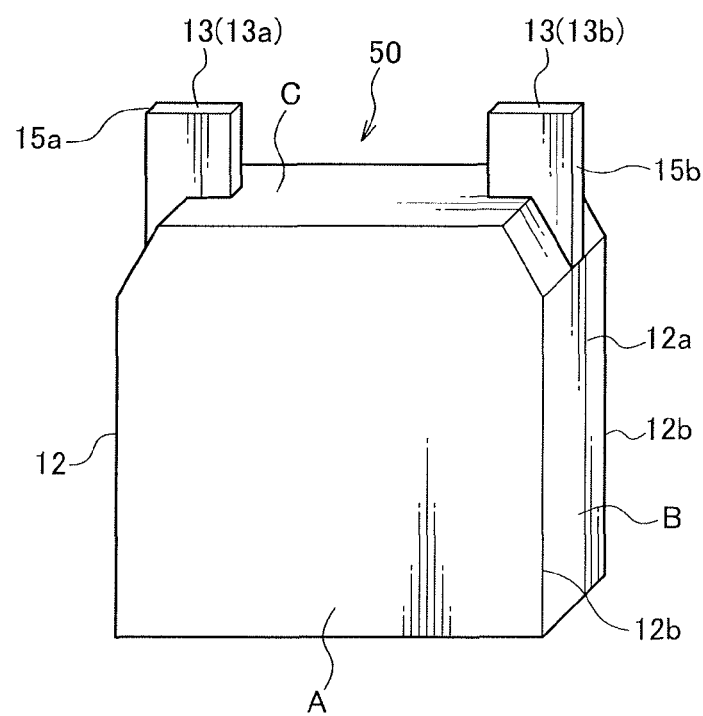
FIG. 23 is a perspective view of a storage cell in a storage module according to a fourth embodiment of this invention.
Figure 24:
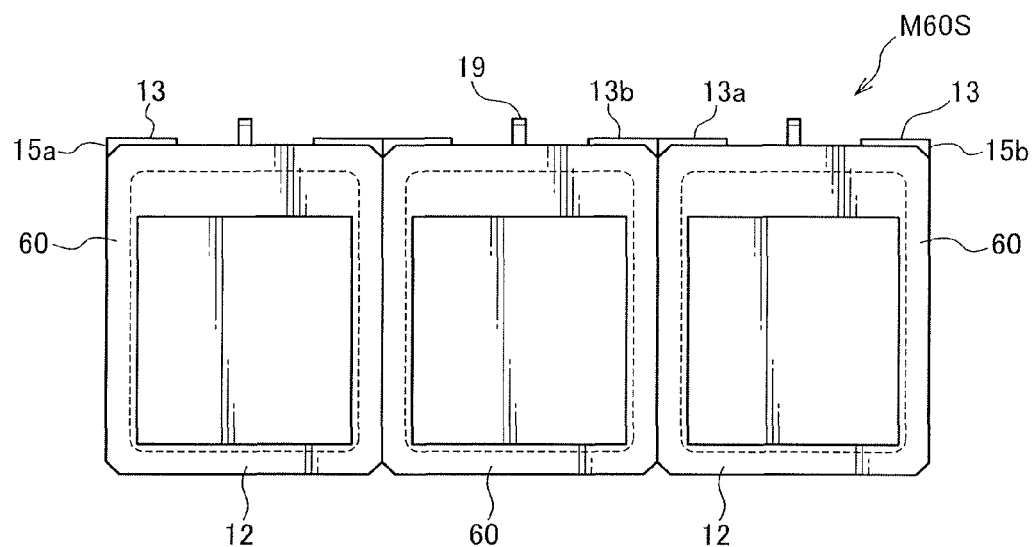
FIG. 24 is a front view of a storage module according to a fifth embodiment of this invention.
Figure 25:
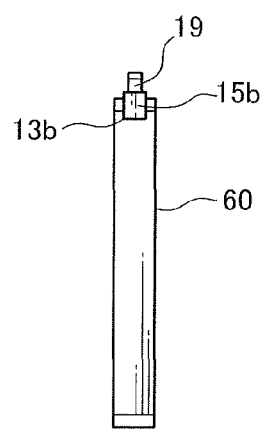
FIG. 25 is a side view of the storage module.
Figure 26:
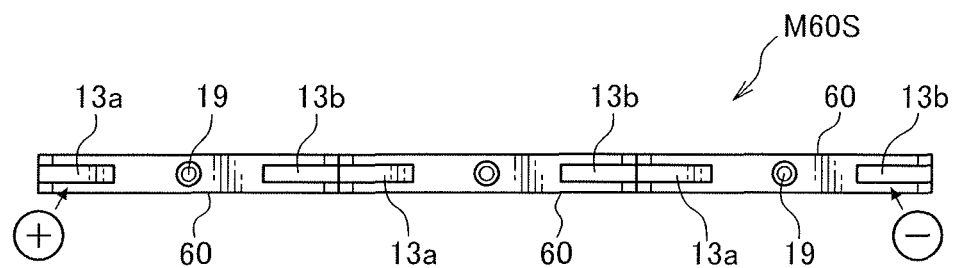
FIG. 26 is a plan view of the storage module.

In FIG. 23, the storage cell 50 is constituted by an electric double layer capacitor. The storage cell 50 includes a storage unit that stores a charge, the container 12 housing the storage unit, and the electrode terminal 13 that outputs and inputs the charge stored in the storage unit. The electrode terminal 13 includes the positive electrode terminal 13a and the negative electrode terminal 13b.

The storage unit is an angular laminated body including a positive electrode body, a negative electrode body, and a separator interposed between the positive electrode body and the negative electrode body. The positive electrode body and the negative electrode body include an electrode layer that stores a charge, or in other words a polarized electrode, and a collector layer that outputs and inputs the charge, or in other words a collector electrode. In the storage cell 50, homopolar leads of the collector electrodes are bundled together, and the electrode terminals 13 of corresponding polarities are connected to resulting bundled portions.

The container 12 is formed in an angular shape, or more specifically a rectangular parallelepiped shape, in alignment with an outer shape of the storage unit. A chamber that houses the storage unit together with an electrolyte is defined in the interior of the container 12.

The pair of electrode terminals 13 includes a positive electrode terminal 13a having a joint surface 15a that is substantially coplanar with one of two opposing surfaces of the container 12, and a negative electrode terminal 13b having a joint surface 15b that is substantially coplanar with the other surface.

The positive electrode terminal 13a and the negative electrode terminal 13b are respectively formed from metal plate in a shape having a short length. The bundled portions of the collector layer leads are fixed by welding or the like to the first end portions 13c of the positive electrode terminal 13a and the negative electrode terminal 13b, which are positioned in the interior of the container 12. The second end portions 13d of the positive electrode terminal 13a and the negative electrode terminal 13b, which project to the outside of the container 12, respectively constitute the joint surface 15a and the joint surface 15b for establishing an electric connection.

The container 12 is a rectangular parallelepiped, and therefore the two opposing surfaces of the container 12 may refer to the front surface A and the back surface, the left side surface B and the right side surface, or the upper surface C and the lower surface. However, the electrode terminals 13 project from the upper surface C, and therefore the two opposing surfaces of the container 12 refer to either the front surface A and the back surface or the left side surface B and the right side surface, but do not refer to the upper surface C and the lower surface.

In this embodiment, with respect to an arrangement direction of the storage cell 50 in a storage module, the two opposing surfaces of the container 12 refer to the left side surface B and the right side surface of the container 12.

The positive electrode terminal 13a projects above the container 12 from a right end portion center in a left-right direction, i.e. a lengthwise direction, of the upper surface C of the container 12 such that the electric connection joint surface 15a is formed to be substantially coplanar with the right side surface of the container 12. The negative electrode terminal 13b, meanwhile, projects above the container 12 from a left end portion center in the left-right direction, i.e. the lengthwise direction, of the upper surface C of the container 12 such that the electric connection joint surface 15b is formed to be substantially coplanar with the left side surface of the container 12.

Similarly to the embodiments described heretofore, the container 12 is formed from the frame body 12a and the pair of film bodies 12b.

The frame body 12a is formed from a resin having a thermal bonding property and an electrical insulating property in a rectangular shape that corresponds to the outer shape of the angular storage unit. The frame body 12a is formed in a frame shape having four edge portions, namely an upper edge portion, a lower edge portion, a right edge portion, and a left edge portion, and a region surrounded by the four edge portions is open to the front and the rear.

The film body 12b is a laminate film formed in the shape of a sheet whose shape and size are substantially identical to the front and rear surfaces of the frame body 12a. The film body 12b has a laminated structure constituted by a plurality of resin layers and a metallic intermediate layer. In the film body 12b, a layer on a surface exposed to the inner side of the frame body 12a is formed from resin having a thermal bonding property and an electrical insulating property.

The electrode terminal 13 includes the first end portion 13c projecting to the inner side of the frame body 12a, the second end portion 13d projecting to the outer side of the frame body 12a, and an intermediate portion 13e buried in the frame body 12a. The intermediate portion 13e of the electrode terminal 13 is insert-molded so as to be interposed in a predetermined position of the frame body 12a.

The bundled portions of the collector layer leads of the storage units are fixed and electrically connected by welding or the like to end portions of the respective electrode terminals 13 projecting to the inner side of the frame body 12a. The film bodies 12b are then overlapped onto the front and rear surfaces of the frame body 12a, whereupon peripheral edge portions of the film bodies 12b are thermally bonded respectively to the front and rear surfaces of the frame body 12a by heat sealing processing.

As regards electrolyte injection into the container 12, an unprocessed part not subjected to thermal bonding is left during the heat sealing processing, and the electrolyte is charged into the interior of the container 12 through the unprocessed part. Following injection of the electrolyte, the unprocessed part is sealed by heat sealing processing.

Through the processes described above, the storage cell 50 including the positive electrode terminal 13a and the negative electrode terminal 13b can be manufactured simply, easily, and efficiently. The storage cell 50 includes a gas purging valve, not shown in the figures, to keep the internal pressure of the container 12 at or below a predetermined level.

When a plurality of the storage cells 50 are arranged in a row such that the left and right surfaces of the container 12 overlap, the positive electrode terminal 13a and negative electrode terminal 13b of adjacent storage cells 50 overlap in identical positions. Therefore, in contrast to the conventional storage cell 110, there is no need to bend the electrode terminals 13 in order to connect the electrode terminals 13 electrically, and as a result, the electrode terminals 13 between the storage cells 50 can be electrically connected simply and easily by welding or the like. In other words, using the storage cell 50, a storage module can be assembled simply, easily, and efficiently.

Further, since there is no need to bend to the positive electrode terminal 13a and the negative electrode terminal 13b of the respective storage cells 50, the length of the part of each electrode terminal 13 that projects from the container 12 can be shortened. As a result, the electric resistance of the electrode terminal 13 can be reduced.

Next, referring to FIGS. 24 to 27, a storage module M60S according to a fifth embodiment of this invention will be described. The storage module M60S is constituted by a laminated body of storage cells 60.

In the storage cell 60 shown in FIGS. 24 to 27, sites that are functionally identical to the storage cell 50 shown in FIG. 23 have been allocated identical reference symbols.

In the storage cell 60 constituting the storage module M60S, a plate thickness of the positive electrode terminal 13a and the negative electrode terminal 13b is set to be larger than that of the embodiments described heretofore. In the storage cell 60, an amount by which the positive electrode terminal 13a and the negative electrode terminal 13b project from the container 12 is reduced in accordance with the increase in the plate thickness of the electrode terminals 13. All other sites are configured similarly to the storage cell 50 shown in FIG. 23, and therefore similar effects are obtained.

The volume occupied by the storage cell 60 is smaller than that of the storage cell 50 shown in FIG. 23 by an amount corresponding to the reduction in the amount by which the positive electrode terminal 13a and the negative electrode terminal 13b project from the container 12. Therefore, the storage module M60S can be reduced in size. The storage cell 60 includes a gas purging valve 19 to keep the internal pressure at or below a predetermined level.

In each storage cell 60, the positive electrode terminal 13a is drawn out above the container 12 from the right end portion center in the left-right direction, i.e. the lengthwise direction, of the upper surface C of the container 12 such that the electric connection joint surface 15a is formed on a right side end surface to be substantially coplanar with the right side surface of the container 12. The negative electrode terminal 13b, meanwhile, is drawn out above the container 12 from the left end portion center in the left-right direction, i.e. the lengthwise direction, of the upper surface C of the container 12 such that the electric connection joint surface 15b is formed on a left side end surface to be substantially coplanar with the left side surface B of the container 12.

Figure 27:
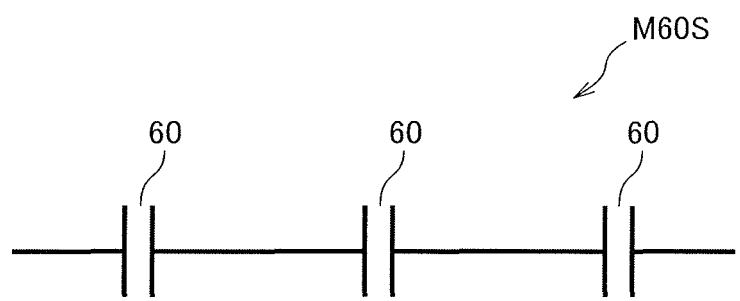
FIG. 27 is a circuit configuration diagram of the storage module.

A plurality of the storage cells 60 are arranged in a row in the left-right direction of the container 12. The negative electrode terminal 13b and the positive electrode terminal 13a overlapped in identical positions are electrically connected by welding or the like via the joint surface 15a and the joint surface 15b. In other words, as shown in FIG. 27, the plurality of storage cells 40 are electrically connected in series.

Next, referring to FIGS. 28 to 31, a storage module M70SP according to a sixth embodiment of this invention will be described. The storage module M70SP is constituted by a laminated body of storage cells 70.

In the storage cell 70 shown in FIGS. 28 to 31, sites that are functionally identical to the storage cell 50 shown in FIG. 23 have been allocated identical reference symbols.

In the storage cell 70, the positive electrode terminal 13a projects above the container 12 from the front surface A side of a right end portion on the upper surface C of the container 12 such that the electric connection joint surface 15a is formed to be substantially coplanar with the right side surface of the container 12 and an electric connection joint surface 15c is formed to be substantially coplanar with the front surface A of the container 12. The negative electrode terminal 13b, meanwhile, projects above the container 12 from the front surface A side of a left end portion on the upper surface C of the container 12 such that the electric connection joint surface 15b is formed to be substantially coplanar with the left side surface B of the container 12 and an electric connection joint surface 15d is formed to be substantially coplanar with the front surface A of the container 12.

In the storage module M70SP, the storage cell 70 includes two types of storage cells, namely a storage cell 70A in which the pair of electrode terminals 13 are disposed on the front surface A side of the container 12 and a storage cell 70B in which the pair of electrode terminals 13 are disposed on the back surface side of the container.

As described above, the storage cell 70A includes the pair of electrode terminals 13 on the front surface A side of the container 12.

In the storage cell 70B, the positive electrode terminal 13a projects above the container 12 from the back surface side of the right end portion of the upper surface C of the container 12. The positive electrode terminal 13a includes the electric connection joint surface 15a formed to be substantially coplanar with the right side surface of the container 12 and the electric connection joint surface 15c formed to be substantially coplanar with the back surface of the container 12. The negative electrode terminal 13b, meanwhile, projects above the container 12 from the back surface side of the left end portion of the upper surface C of the container 12. The negative electrode terminal 13b includes the electric connection joint surface 15b formed to be substantially coplanar with the left side surface B of the container 12 and the electric connection joint surface 15d formed to be substantially coplanar with the back surface of the container 12.

When a plurality of the storage cells 70A are arranged in the lengthwise direction of the upper surface C of the container 12, i.e. the left-right direction of the container 12, the containers 12 are adjacent to each other. The negative electrode terminal 13b and the positive electrode terminal 13a overlapped in identical positions between the adjacent containers 12 are then electrically connected by welding or the like via the joint surface 15a and the joint surface 15b.

Further, when a plurality of the storage cells 70B are arranged in the lengthwise direction of the upper surface C of the container 12, i.e. the left-right direction of the container 12, the containers 12 are adjacent to each other. The negative electrode terminal 13b and the positive electrode terminal 13a overlapped in identical positions between the adjacent containers 12 are then electrically connected by welding or the like via the joint surface 15a and the joint surface 15b.

The plurality of storage cells 70A and storage cells 70B include a row on which three storage cells 70A are connected in series and a row on which three storage cells 70B are connected in series. The row of the storage cells 70A and the row of the storage cells 70B are arranged in a front-rear direction of the container 12, or in other words a widthwise direction of the upper surface C of the container 12.

The positive electrode terminal 13a and the negative electrode terminal 13b overlapped in identical positions between the adjacent containers 12 in the front-rear direction are electrically connected by welding or the like via the joint surface 15c and the joint surface 15d. In other words, of the plurality of storage cells 70, the storage cells 70A and the storage cells 70B that are respectively adjacent to each other in the front-rear direction of the container 12 are electrically connected in parallel.

Figure 30:
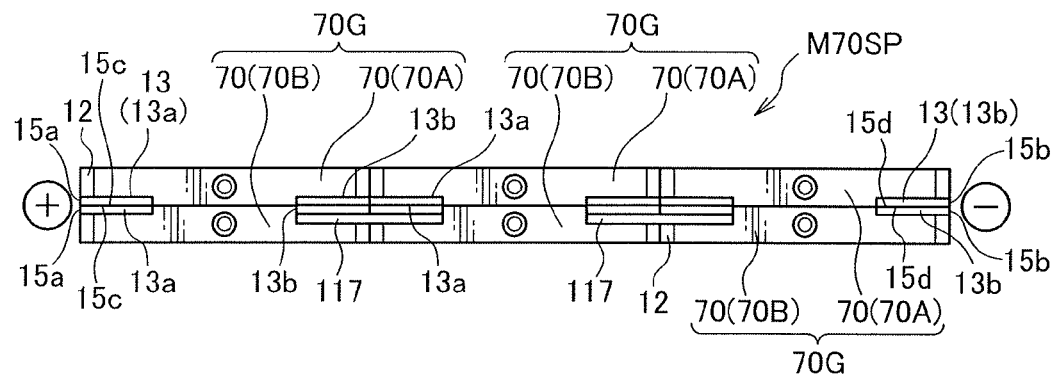
FIG. 30 is a plan view of the storage module.
Figure 31:
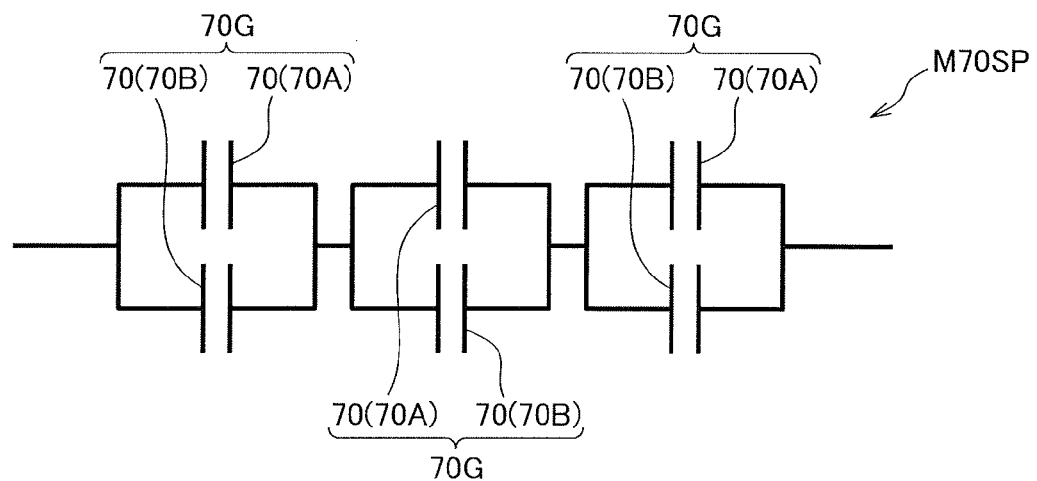
FIG. 31 is a circuit configuration diagram of the storage module.

As shown in FIG. 30, the adjacent opposing storage cell 70A and storage cell 70B form a storage cell group 70G. Between the respective storage cell groups 70G adjacent to each other in the left-right direction of the container 12, the positive electrode terminal 13a of one storage cell group 70G and the negative electrode terminal 13b of another storage cell group 70G overlap each other in identical positions. The respective storage cell groups 70G are electrically connected to each other in series.

The storage cell 70 includes a joint surface that is substantially coplanar with the front surface A or the back surface of the container 12 relative to the positive electrode terminal 13a having the joint surface 15a that is substantially coplanar with the left side surface B of the container 12, which serves as one of two opposing surfaces of the container 12, i.e. in this embodiment the left side surface B and the right side surface of the container 12. Further, the storage cell 70 includes a joint surface that is substantially coplanar with the front surface A or the back surface of the container 12 relative to the negative electrode terminal 13b having the joint surface 15b that is substantially coplanar with the other opposing surface. Therefore, the storage module M70SP can be assembled using the plurality of storage cells 70 without any need for a bus bar for electrically connecting the storage cells 70 to each other in series/parallel.

Figure 28:
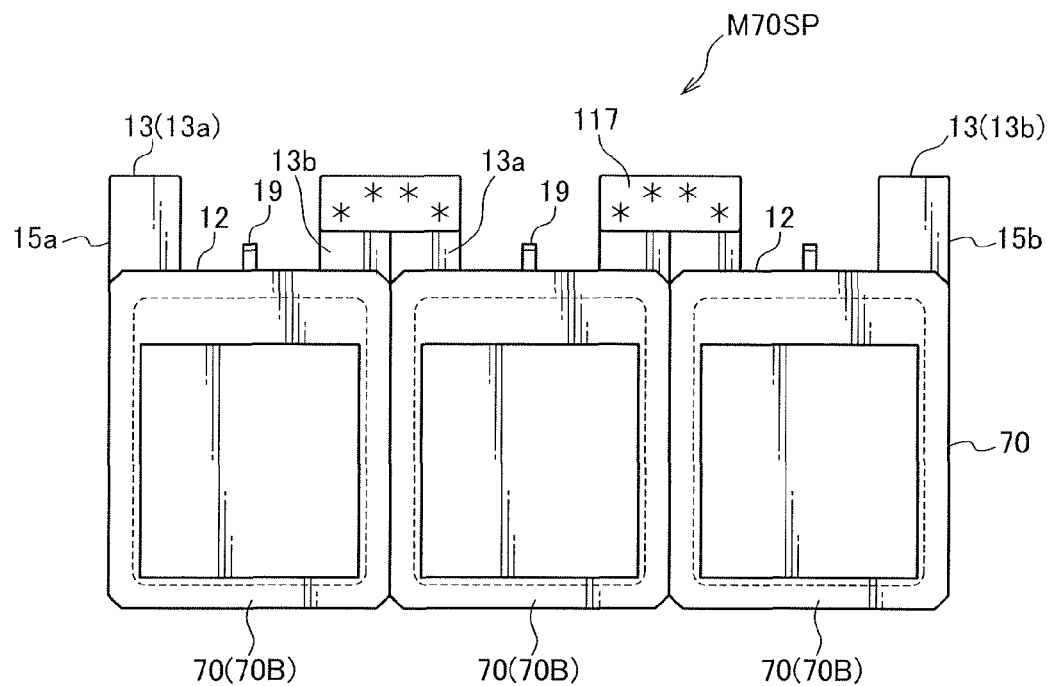
FIG. 28 is a front view of a storage module according to a sixth embodiment of this invention.
Figure 29:
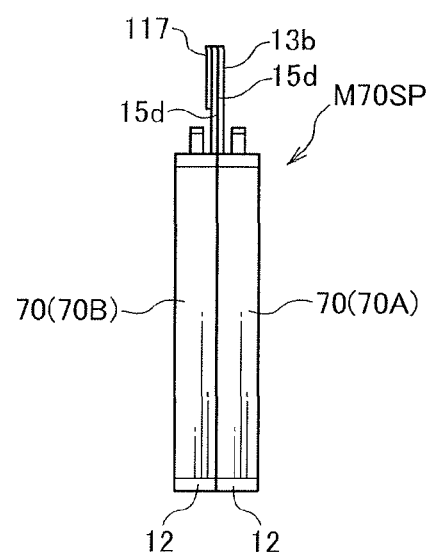
FIG. 29 is a side view of the storage module.

As shown in FIGS. 28 and 29, a connecting plate 117 is used to connect the storage cells 70 electrically. The connecting plate 117 is overlapped across the negative electrode terminal 13b and positive electrode terminal 13a between a pair of storage cells 70A or a pair of storage cells 70B adjacent to each other in the left-right direction of the container 12, from among four storage cells 70A and 70B adjacent to each other in the left-right direction and the front-rear direction of the container 12. The connecting plate 117 is spot-welded from the front-rear direction of the container 12, whereby the four electrode terminals 13 adjacent to each other in the front-rear direction and the left-right direction of the container 12 are electrically connected to each other simply and efficiently in series/parallel.

Further, the connecting plate 117 is not used on either the positive electrode terminals 13a between the storage cell 70A and the storage cell 70B positioned at one end, i.e. a left end in the figures, of the row or the negative electrode terminals 13b between the storage cell 70A and the storage cell 70B positioned at another end, i.e. a right end in the figures, of the row. These electrode terminals are electrically connected to each other directly by applying spot welding thereto from the front-rear direction of the container 12.

By spot-welding the electrode terminals 13 using the connecting plate 117 in this manner, the plurality of storage cells 70 can be electrically connected to each other simply, efficiently, and appropriately. As a result, the storage module M70SP is assembled simply, efficiently, and appropriately.

In each of the embodiments described above, the container 12 is formed such that the outer shape thereof is a rectangular parallelepiped, or in other words a hexahedron. However, the disposal configuration of the electrode terminals 13 according to this invention is not limited thereto, and the container 12 may be a polyhedron other than a rectangular parallelepiped.

Figure 32:
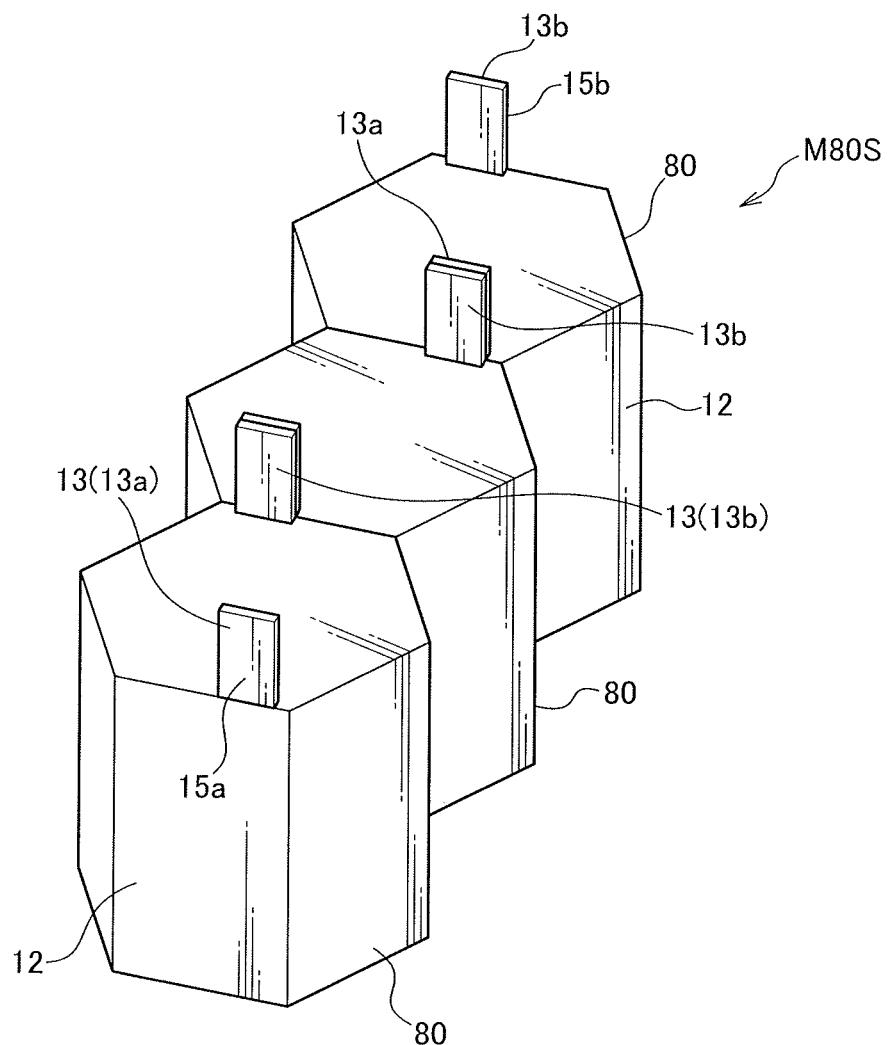
FIG. 32 is a perspective view showing a modified example of the storage module.

As shown in FIG. 32, for example, the container 12 of a storage cell 80 may be formed with octagonal upper and lower surfaces such that an outer peripheral surface thereof is octahedral. In a storage module M80S, the container 12 includes two opposing surfaces in an arrangement direction of the storage cells 80. Accordingly, the positive electrode terminal 13a is disposed to have a joint surface 15a that is substantially coplanar with one of the two opposing surfaces, and the negative electrode terminal 13b is disposed to have a joint surface 15b that is substantially coplanar with the other opposing surface.

In the storage module according to this invention, the number and arrangement direction of the storage cells are not limited to the illustrated examples.

Although the invention has been described above with reference to certain embodiments, the invention is not limited to the embodiments described above. Modifications and variations of the embodiments described above will occur to those skilled in the art, within the scope of the claims.

The contents of Tokugan 2009-214288, with a filing date of Sep. 16, 2009 in Japan, are hereby incorporated by reference.

INDUSTRIAL APPLICABILITY

The electrode terminal disposal configuration according to this invention is not limited to application to an electric double layer capacitor or a lithium battery, and may be applied widely to various storage cells that can be charged/discharged repeatedly.

The embodiments of this invention in which an exclusive property or privilege is claimed are defined as follows:

1. A storage module, comprising a plurality of storage cells, wherein each storage cell among the plurality of storage cells comprises:
   a storage unit configured to store a charge;
   a polyhedral container that houses the storage unit and has
      top and bottom ends opposing each other in a height direction,
      first and second surfaces opposing each other in a left-right direction, and
      third and fourth surfaces opposing each other in a front-rear direction, the first through fourth surfaces connecting the top end with the bottom end; and
   a pair of electrode terminals configured to output and input the charge of the storage unit,
   wherein the electrode terminals comprise:
      a positive electrode terminal that
         projects, in the height direction, upwardly from the top end of the container, and
         has a first joint surface above the top end of the container, substantially coplanar with the first surface of the container, and joined to an electrode terminal of an adjacent storage cell adjacent to said storage cell in the left-right direction; and
      a negative electrode terminal that
         projects, in the height direction, upwardly from the top end of the container, and
         has a second joint surface above the top end of the container, substantially coplanar with the second surface of the container, and joined to an electrode terminal of an adjacent storage cell adjacent to said storage cell in the left-right direction, wherein
   the positive electrode terminal further has a third joint surface above the top end of the container and substantially coplanar with the third surface of the container,
   the negative electrode terminal further has a fourth joint surface above the top end of the container and substantially coplanar with the third surface of the container, and
   each of the third and fourth joint surfaces is joined to an electrode terminal of an adjacent storage cell adjacent to said storage cell in the front-rear direction.

2. The storage module as defined in claim 1,
wherein the plurality of storage cells are laminated in a single direction, and the electrode terminals between adjacent storage cells overlap each other in identical positions.

3. The storage module as defined in claim 2,
wherein the electrode terminals of the adjacent storage cells are formed in plane symmetry about a contact surface between the adjacent storage cells.

4. The storage module as defined in claim 1, wherein
the plurality of storage cells include a plurality of storage cell groups each constituted by a number of the storage cells,
the storage cells of respective storage cell groups are laminated in a single direction, and
the electrode terminals between adjacent storage cell groups overlap each other in identical positions.

5. The storage module as defined in claim 4,
wherein the electrode terminals of the adjacent storage cell groups are formed in plane symmetry about a contact surface between the storage cell groups.

6. The storage module as defined in claim 1,
wherein the container of each storage cell among the plurality of storage cells includes:
a frame body surrounding the storage unit; and
a film body that seals front and rear surfaces of the frame body, wherein the front and rear surfaces are open to an inner side of the frame body,
wherein each of the electrode terminals includes:
a first end portion projecting to the inner side of the frame body;
a second end portion projecting to an outer side of the frame body; and
an intermediate portion interposed without a gap between the frame body and the film body.

7. The storage module as defined in claim 1, wherein
the electrode terminals are arranged at corners of the container.

8. A storage module, comprising a plurality of storage cells, wherein each storage cell among the plurality of storage cells comprises:
a storage unit configured to store a charge;
a polyhedral container that houses the storage unit and has
top and bottom ends opposing each other in a height direction,
first and second surfaces opposing each other in a left-right direction, and
third and fourth surfaces opposing each other in a front-rear direction, the first through fourth surfaces connecting the top end with the bottom end; and
a pair of electrode terminals configured to output and input the charge of the storage unit,
wherein the electrode terminals comprise:
a positive electrode terminal that
projects, in the height direction, upwardly from the top end of the container, and
has a first joint surface above the top end of the container, substantially coplanar with the first surface of the container, and joined, by direct contact, to an electrode terminal of an adjacent storage cell adjacent to said storage cell in the left-right direction; and
a negative electrode terminal that
projects, in the height direction, upwardly from the top end of the container, and
has a second joint surface above the top end of the container, substantially coplanar with the second surface of the container, and joined, by direct contact, to an electrode terminal of an adjacent storage cell adjacent to said storage cell in the left-right direction, wherein
the positive electrode terminal further has a third joint surface above the top end of the container and substantially coplanar with the third surface of the container,
the negative electrode terminal further has a fourth joint surface above the top end of the container and substantially coplanar with the third surface of the container, and
each of the third and fourth joint surfaces is joined, by direct contact, to an electrode terminal of an adjacent storage cell adjacent to said storage cell in the front-rear direction.

9. The storage module as defined in claim 8, wherein
the electrode terminals are arranged at corners of the container.

10. The storage module as defined in claim 8, wherein
the plurality of storage cells comprise first, second, third and fourth storage cells, and
the first storage cell has
the first joint surface in direct surface contact with the second joint surface of the second storage cell adjacent to said first storage cell in the left-right direction,
the second joint surface in direct surface contact with the first joint surface of the third storage cell adjacent to said first storage cell in the left-right direction, said first storage cell located between the second and third storage cells in the left-right direction,
the third joint surface in direct surface contact with the third joint surface of the fourth storage cell adjacent to said first storage cell in the front-rear direction, and
the fourth joint surface in direct surface contact with the fourth joint surface of the fourth storage cell.

11. A storage module, comprising a plurality of storage cells, wherein each storage cell among the plurality of storage cells comprises:
a storage unit configured to store a charge;
a polyhedral container that houses the storage unit and has
a topmost surface and a bottom surface opposing each other in a height direction,
first and second surfaces opposing each other in a left-right direction, and
third and fourth surfaces opposing each other in a front-rear direction, the first through fourth surfaces connecting the topmost surface with the bottom surface; and
a pair of electrode terminals configured to output and input the charge of the storage unit,
wherein the electrode terminals comprise:
a positive electrode terminal that
projects, in the height direction, upwardly from the topmost surface of the container, and
has a first joint surface which is
above the topmost surface of the container,
substantially coplanar with the first surface of the container, and
joined, at a position above the topmost surface of the container, to an electrode terminal of an adjacent storage cell adjacent to said storage cell in the left-right direction; and
a negative electrode terminal that
projects, in the height direction, upwardly from the topmost surface of the container, and has a second joint surface which is
- above the topmost surface of the container,
- substantially coplanar with the second surface of the container, and
- joined, at a position above the topmost surface of the container, to an electrode terminal of an adjacent storage cell adjacent to said storage cell in the left-right direction, wherein the positive electrode terminal further has a third joint surface above the topmost surface of the container and substantially coplanar with the third surface of the container, the negative electrode terminal further has a fourth joint surface above the topmost surface of the container and substantially coplanar with the third surface of the container, and each of the third and fourth joint surfaces is joined, at a position above the topmost surface of the container, to an electrode terminal of an adjacent storage cell adjacent to said storage cell in the front-rear direction.

12. The storage module as defined in claim 11, wherein
the plurality of storage cells comprise first, second, third and fourth storage cells, and
the first storage cell has
- the first joint surface in direct surface contact with the second joint surface of the second storage cell adjacent to said first storage cell in the left-right direction,
- the second joint surface in direct surface contact with the first joint surface of the third storage cell adjacent to said first storage cell in the left-right direction, said first storage cell located between the second and third storage cells in the left-right direction,
- the third joint surface in direct surface contact with the third joint surface of the fourth storage cell adjacent to said first storage cell in the front-rear direction, and
- the fourth joint surface in direct surface contact with the fourth joint surface of the fourth storage cell.

13. The storage module as defined in claim 12, wherein
in each storage cell among the plurality of storage cells,
- the first and third joint surfaces are connected to each other at a first corner of the container, the first corner being between the first and third surfaces of the container, and
- the second and fourth joint surfaces are connected to each other at a second corner of the container, the second corner being between the second and third surfaces of the container.

14. The storage module as defined in claim 11, wherein
in each storage cell among the plurality of storage cells,
- the first and third joint surfaces are connected to each other at a first corner of the container, the first corner being between the first and third surfaces of the container, and
- the second and fourth joint surfaces are connected to each other at a second corner of the container, the second corner being between the second and third surfaces of the container.

* * * * *